(12) United States Patent
Yuan

(10) Patent No.: US 12,539,860 B2
(45) Date of Patent: Feb. 3, 2026

(54) SYSTEMS AND METHODS FOR DRIVE-OFF FROM A STOPPED POSITION FOR AN AUTONOMOUS DRIVING VEHICLE

(71) Applicant: Apollo Autonomous Driving USA LLC, Sunnyvale, CA (US)

(72) Inventor: Baoping Yuan, Sunnyvale, CA (US)

(73) Assignee: Apollo Autonomous Driving USA LLC, Sunnyvale, CA (US)

( * ) Notice: Subject to any disclaimer, the term of this patent is extended or adjusted under 35 U.S.C. 154(b) by 290 days.

(21) Appl. No.: 18/297,594

(22) Filed: Apr. 7, 2023

(65) Prior Publication Data

US 2024/0336264 A1    Oct. 10, 2024

(51) Int. Cl.
*B60W 30/18*    (2012.01)
*B60W 10/04*    (2006.01)
(Continued)

(52) U.S. Cl.
CPC ...... *B60W 30/18054* (2013.01); *B60W 10/04* (2013.01); *B60W 10/18* (2013.01);
(Continued)

(58) Field of Classification Search
CPC .......... B60W 30/18054; B60W 10/04; B60W 10/18; B60W 40/076; B60W 60/0013;
(Continued)

(56) References Cited

U.S. PATENT DOCUMENTS

| 2008/0195267 A1* | 8/2008 | Miranda ........ B60W 30/18027 701/22 |
| 2013/0066493 A1* | 3/2013 | Martin .................. B60W 10/06 180/65.265 |

(Continued)

FOREIGN PATENT DOCUMENTS

| CN | 101372230 A | * | 2/2009 | ............. B60K 28/16 |
| CN | 106274886 A | * | 1/2017 | |

(Continued)

OTHER PUBLICATIONS

Zow et al.; WO2023082086A1.translate; Automatic Vehicle Control Method and Apparatus; Huawei Tech Co Ltd. (Year: 2023).*

(Continued)

*Primary Examiner* — B M M Hannan
(74) *Attorney, Agent, or Firm* — Oppedahl Patent Law Firm LLC

(57) ABSTRACT

Smooth and agile acceleration of an autonomous driving vehicle (ADV) that is being held at a standstill or is otherwise at a stop is important for ADV safety, efficiency, and occupant enjoyment. For example, as a practical matter, an ADV at an uncontrolled intersection should quickly and smoothly drive-off when it is its turn to advance—otherwise, it may get stuck at the intersection. Embodiments herein provide systems and methods to facilitate a pleasant and comfortable ride while having the ADV drive off smoothly (e.g., not a large jerk) and safely (e.g., not slipping) during driving from a stop—regardless of whether the ADV is on a slope or on a neutral (i.e., not sloped) surface. In one or more embodiments, the drive-off process may be divided into several stages from a standstill to an acceleration settle stage.

18 Claims, 21 Drawing Sheets

(51) Int. Cl.
*B60W 10/18* (2012.01)
*B60W 40/076* (2012.01)
*B60W 60/00* (2020.01)

(52) U.S. Cl.
CPC ...... *B60W 40/076* (2013.01); *B60W 60/0013* (2020.02); *B60W 2520/30* (2013.01)

(58) Field of Classification Search
CPC ....... B60W 2520/30; B60W 30/18027; B60W 2520/105; B60W 2552/15; B60W 30/18118
USPC .......................................................... 701/23
See application file for complete search history.

(56) References Cited

U.S. PATENT DOCUMENTS

| | | | | |
|---|---|---|---|---|
| 2018/0330173 | A1* | 11/2018 | Zhu | B60W 10/06 |
| 2020/0009962 | A1* | 1/2020 | Tanaka | B60W 30/18018 |
| 2021/0171015 | A1* | 6/2021 | Artail | B60K 6/445 |
| 2022/0080942 | A1* | 3/2022 | Eberl | B60W 30/18063 |

FOREIGN PATENT DOCUMENTS

| | | | | |
|---|---|---|---|---|
| CN | 107949512 | A | * | 4/2018 |
| FR | 3132894 | A1 | * | 8/2023 |
| JP | 7212233 | B2 | * | 1/2023 |
| KR | 20190021801 | A | * | 3/2019 |
| WO | WO-2023082086 | A1 | * | 5/2023 |

OTHER PUBLICATIONS

Osaki et al.; CN101372230A.translate; Vehicle drive control apparatus; Advics Co Ltd. (Year: 2009).*

* cited by examiner

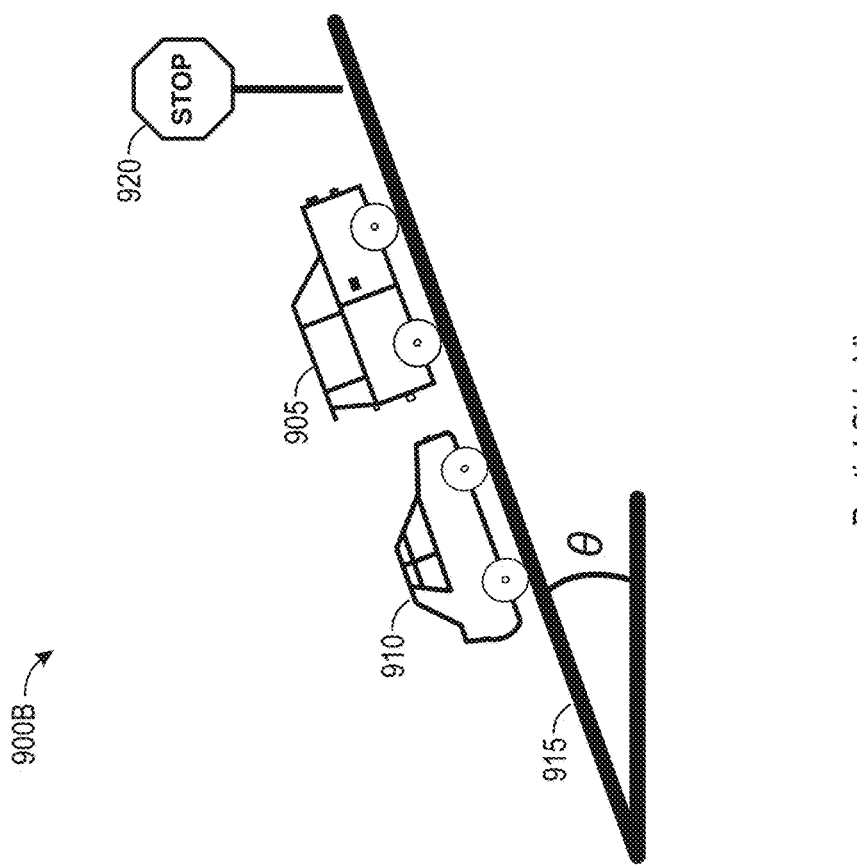
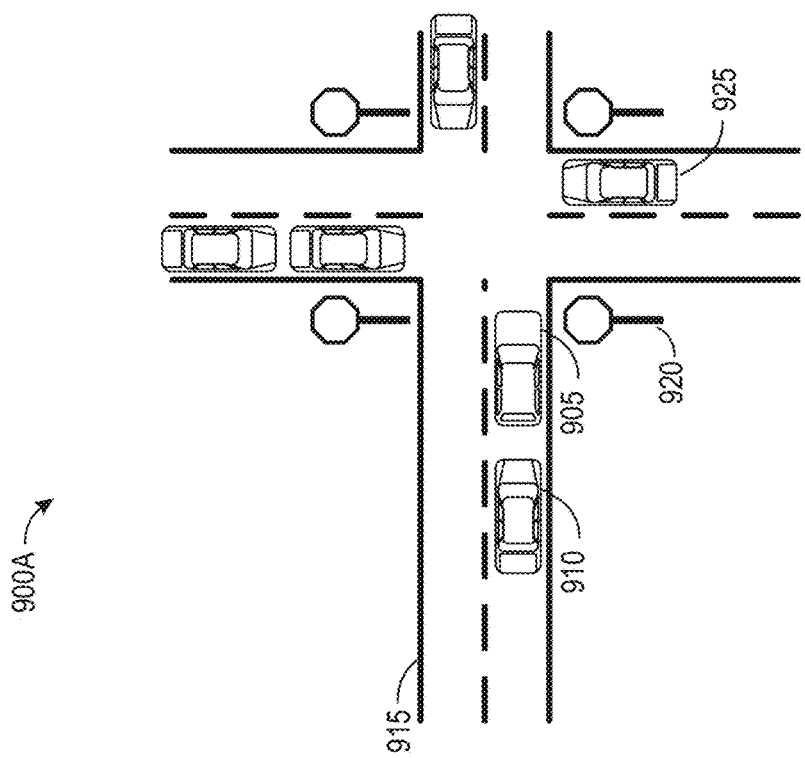

SYSTEMS AND METHODS FOR DRIVE-OFF FROM A STOPPED POSITION FOR AN AUTONOMOUS DRIVING VEHICLE

TECHNICAL FIELD

Embodiments of the present disclosure relate generally to operating autonomous driving vehicles. More particularly, embodiments of the disclosure relate to controlling an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is important to control the ADV to avoid accidents. According to the American transaction department, 5% of crash accidents were caused by braking problems. It is difficult to control the braking unit of the ADV to hold the ADV stably, particularly if the ADV is on a gradient. If the ADV starts to roll back or forward, it is challenging to control the ADV to avoid further rolling faster. On the other hand, the occupant's or passenger's experience is also a factor of consideration for controlling the ADV if the ADV starts to roll.

Conventionally, if the ADV starts to roll while in standstill status, the control system of the ADV would add more pressure. However, the conventional method has several problems. For example, the command of adding more pressure may not transfer successfully to the braking system due to computing delays or software errors. The braking torque may not be enough to protect the vehicle from rolling. The braking system's torque may have some issues. The ramp-up rate of brake torque may be too low. Other braking systems may have issues at the same time. Thus, the conventional method cannot hold the ADV effectively. Further, there may be an occupant or passenger comfort issue if the ramp-up rate of brake torque is too high.

In addition to issues related to braking, there are also issues related to accelerating from a stop. Consider, by way of example, an ADV that is stopped at an intersection, particularly an uncontrolled intersection in which there are no electronically controlled right-of-way indicators. In such situations, if the ADV has too slow of an acceleration from the stop position (which may also be referred to herein as "drive off"), another vehicle may proceed before the ADV even if it was properly the ADV's turn to advance through the intersection. In such a scenario, it is not uncommon for the ADV to be stuck at the intersection for a long time as successive drivers perceive the slow drive-off reaction of the ADV as yielding the right-of-way to them.

In addition to potentially being stuck at an uncontrolled intersection, there are additional problems that should be considered for the drive-off process of an ADV.

First, there are safety considerations. For example, if the ADV is stopped on a road that is sloped, release of the braking system should be coordinated so that the ADV does not roll backwards into a vehicle behind it. Transitioning from a stationary state to a driving state should be agile and smooth. Agile drive-off can improve vehicle safety and efficiency. Smoothly accelerating from a stop mimics regular traffic, which avoids confusion and potential accidents at intersections. Also, smooth operations tend to result in more efficient use of resources (battery power or petroleum depending upon the type of engine in the ADV).

Second, agile drive-off not only improves vehicle safety and efficiency, but it is more pleasing for passengers. To ensure occupants have a pleasant and comfortable ride, the ADV should drive off smoothly—with big jerks and without slipping (which can also be a safety issue). Furthermore, a smooth and pleasant ride for occupants should occur at all times and under all circumstances, regardless of the road conditions. For example, the brake torque and wheel torque of the ADV should be controlled adaptively to provide the same smoothness regardless of whether the ADV is accelerating from a stop on an incline (a positive slope) surface, on a decline (a negative slope) surface, or on a flat surface.

Accordingly, what is needed are systems and methods that facilitate a smooth, fast, and safe drive-off for ADV even if the ADV is stopped on an inclined surface with a large slope.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 is a block diagram illustrating a networked system, according to embodiments of the present disclosure.

FIGS. 9A (top view) and 9B (partial side view) depict an autonomous driving vehicle that is stopped at a 4-way stop intersection.

DETAILED DESCRIPTION

Figure 1:
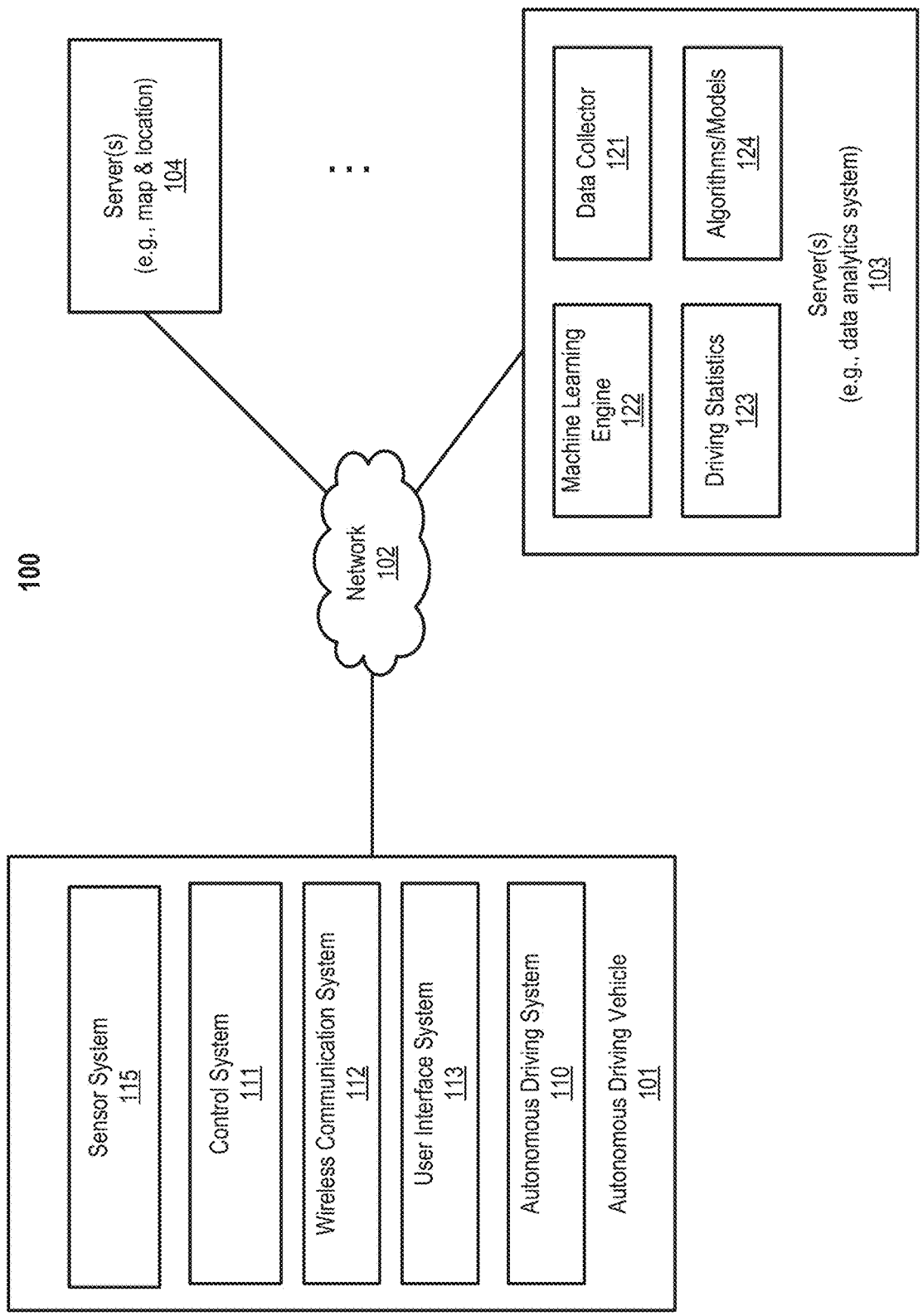

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. A set may contain any number of elements, including the empty set.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. ADV Redundant Holding Controls Embodiments

According to some aspects, embodiments of a redundant holding control technique to prevent rolling of an ADV are provided herein. Not only the safety but also the occupant or passenger feeling of the ADV may be considered. In order to balance the safety and the occupant or passenger comfort, different stages may be determined based on the status of the ADV. Different actions may be performed based on the different stages. In this technique, the brake unit of the control system may add the braking torque quickly based on the rolling speed of the ADV. For example, the brake unit may hold the ADV on a slope. When the vehicle slips, the primary brake may be used to add the wheel pressure, and a warning message (e.g., Message-1) may be generated. for example, the primary brake may be used to add the wheel pressure below a first predetermined rate threshold based on the status of the ADV (mass, rolling speed) and road conditions (friction, slop gradient). If the ADV continues to slip over with the rolling speed exceeding the low-speed threshold, the electronic parking brake (EPB) may be activated, and a warning message (e.g., Message-2) may be generated. If the primary brake fails, or the EBP fails, the secondary brake may be activated, and a warning message (e.g., Message-3) may be generated. If the ADV comes to a standstill, parking may be requested to help to hold the ADV. If all the brakes still cannot hold the ADV from rolling, the engine brake may be used to reduce the crash damage, and a warning message (e.g., Message-4) may be generated.

According to some embodiments, data is received from a plurality of sensors mounted on an ADV being held to a standstill. A status of the ADV including a rolling speed of the ADV is detected based on the data from the plurality of sensors. One of a primary brake or a secondary brake is activated, in response to detecting the status of the ADV being a first status including the rolling speed being higher than zero and lower than a first predetermined speed threshold. An electronic parking brake is activated, in response to detecting the status of the ADV being a second status including the rolling speed being higher than the first predetermined speed threshold and lower than a second predetermined speed threshold.

In one or more embodiments, the status of the ADV may further include a distance between the ADV and an obstacle. In one or more embodiments, whether the primary brake is available in response to detecting the rolling speed being higher than zero may be determined. In one or more embodiments, the primary brake may be activated in response to determining that the primary brake is available. In one or more embodiments, the primary brake may be activated including applying a wheel pressure below a predetermined rate threshold.

In one or more embodiments, a secondary brake may be activated, in response to determining the status of the ADV being a third status including the rolling speed being higher than the second predetermined speed threshold and lower than a third predetermined speed threshold. In one or more embodiments, an engine brake may be activated, in response to determining the status of the ADV being a fourth status including the rolling speed being higher than the third predetermined speed threshold.

In one or more embodiments, parking may be activated, in response to determining the rolling speed being zero. In one or more embodiments, the secondary brake may be activated in response to determining that the primary brake is not available. In one or more embodiments, the secondary brake may be activated including applying a wheel pressure below a predetermined rate threshold.

In one or more embodiments, an engine brake may be activated, in response to determining the rolling speed being higher than the second predetermined speed threshold.

In one or more embodiments, a first warning message may be generated with a first level of warning in response to detecting the status of the ADV being the first status. In one or more embodiments, a second warning message may be generated with a second level of warning in response to detecting the status of the ADV being the second status, where the second level of warning is higher than the first level of warning.

In one or more embodiments, a third warning message may be generated with a third level of warning in response to detecting the status of the ADV being a third status including the rolling speed being higher than the second predetermined speed threshold and lower than a third predetermined speed threshold, where the third level of warning is higher than the second level of warning.

In one or more embodiments, a fourth warning message may be generated with a fourth level of warning in response to detecting the status of the ADV being a fourth status including the rolling speed being higher than the third predetermined speed threshold, where the fourth level of warning is higher than the third level of warning.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks, such as a local area network (LAN), a wide area network (WAN) such as the Internet, a cellular network, a satellite network, an edge network, or a combination thereof, and may comprise wired, wireless, or both connectivity. Server(s) 103-104 may be any kind of server or a cluster of servers, such as Web or cloud servers, application servers, backend servers, or a combination thereof. Servers 103-104 may be data analytics servers, content servers, traffic information servers, map and point of interest (MPOI) servers, location servers, etc.

An ADV refers to a vehicle that may be configured to operate in an autonomous mode in which the vehicle navigates through an environment with little or no input from a driver. Such an ADV may include a sensor system having one or more sensors that are configured to detect information about the environment in which the vehicle operates. The vehicle and its associated controller(s) may use the detected information to navigate through the environment. ADV 101 may operate in a manual mode, a fully autonomous mode, or a partially autonomous mode.

In one or more embodiments, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, wireless signals, or a combination thereof. For example, components 110-115 may be communicatively coupled to each other via a controller area network (CAN) bus. In one or more embodiments, a CAN bus is a vehicle bus standard designed to allow microcontrollers and devices to communicate with each other in applications without a host computer; it is a message-based protocol, designed originally for multiplex electrical wiring within automobiles but may also be used in many other contexts.

Figure 2:
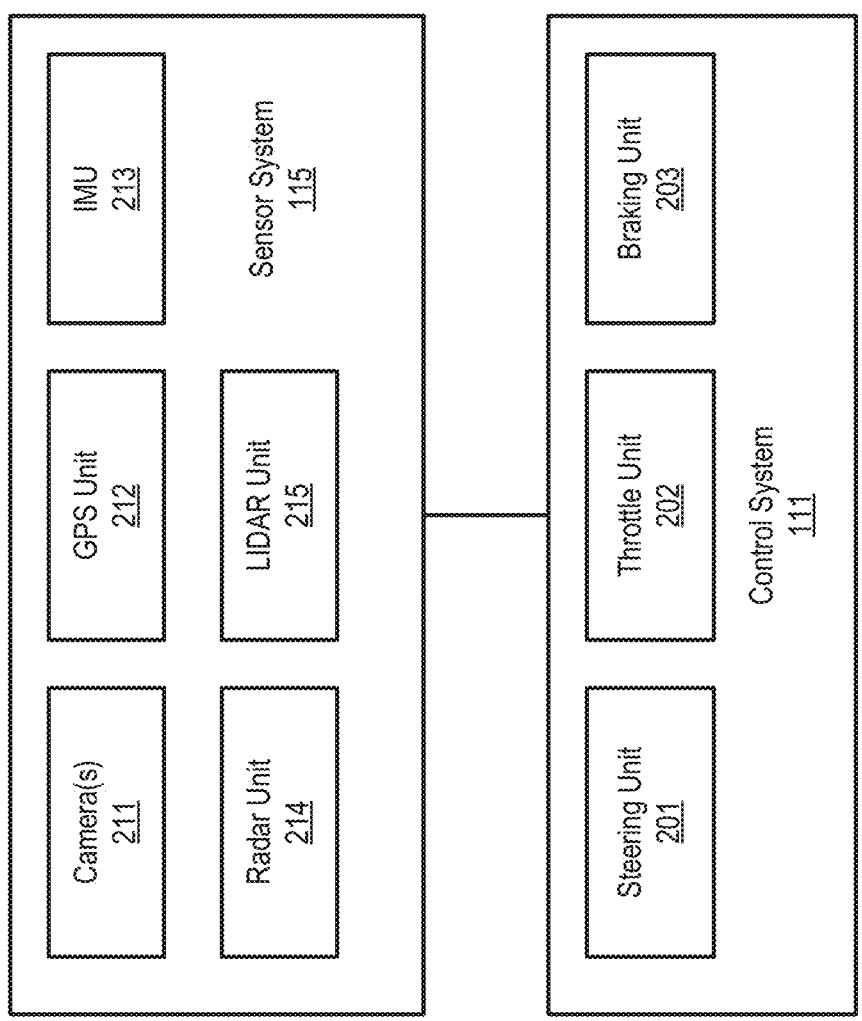
FIG. 2 is a block diagram illustrating an example of an autonomous driving vehicle, according to embodiments of the present disclosure.

Referring now to FIG. 2, in one or more embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In one or more embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, an audio sensor (e.g., a microphone), and a weight or mass sensor. An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In one or more embodiments, one or more sensors may be used to determine the mass or weight of the ADV, including its occupants and any other payload. In one or more embodiments, the mass/weight may be determined using one or more factors, such as torque (e.g., wheel torque need to accelerate, braking torque needed to accelerate or decelerate, etc.). Having one or more mass/weight sensors to gauge the overall weight of the ADV and its contents (including occupants) allows the ADV to use mass and/or weight parameters for one or more determinations, such as braking, accelerating, handling, etc.

In one or more embodiments, vehicle control system 111 includes, but is not limited to, steering unit 201, throttle unit 202 (also referred to as an acceleration unit), and braking unit 203. Steering unit 201 may be used to adjust the direction or heading of the vehicle. Throttle unit 202 may be used to control the speed of the motor or engine which in turn controls the speed and acceleration of the vehicle. Braking unit 203 may be used to decelerate the vehicle by providing friction to slow the wheels or tires of the vehicle. The details of embodiments of the braking unit 203 will be discussed below. Note that the components as shown in FIG. 2 may be implemented in hardware, software, or a combination thereof.

Referring to FIG. 1, wireless communication system 112 is to allow communication between ADV 101 and external systems, such as devices, sensors, other vehicles, etc. For example, wireless communication system 112 may wirelessly communicate with one or more devices directly or via a communication network, such as servers 103-104 over network 102. Wireless communication system 112 may use any cellular communication network or a wireless local area network (WLAN), e.g., using WiFi to communicate with another component or system. Wireless communication system 112 may communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage, etc.) and software (e.g., operating system, planning and routing programs, etc.) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip-related data. For example, ADS 110 may obtain location and route data from an MPOI server, which may be a part of servers 103-104. The location server provides location services and the MPOI server provides map services and the POIs of certain locations. Additionally, or alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third-party entity. Additionally, or alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one or more embodiments, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In one or more embodiments, based on driving statistics 123, machine learning engine 122 generates or trains a set of rules, algorithms, and/or predictive models 124 for a variety of purposes. In one or more embodiments, algorithms 124 may include an algorithm or model to receive data from a plurality of sensors mounted on the ADV being held at a standstill, an algorithm to detect a status of the ADV including a rolling speed of the ADV based on the data from the plurality of sensors, an algorithm to activate (or deactivate) one of a primary brake or a secondary brake, in response to detecting the status of the ADV being a first status including the rolling speed being higher than zero and lower than a first predetermined speed threshold, and/or an algorithm to activate (or deactivate) an electronic parking brake, in response to detecting the status of the ADV being a second status including the rolling speed being higher than the first predetermined speed threshold and lower than a second predetermined speed threshold. Algorithms/models 124 may be uploaded on ADVs to be utilized during autonomous driving in real-time.

Figure 3A:
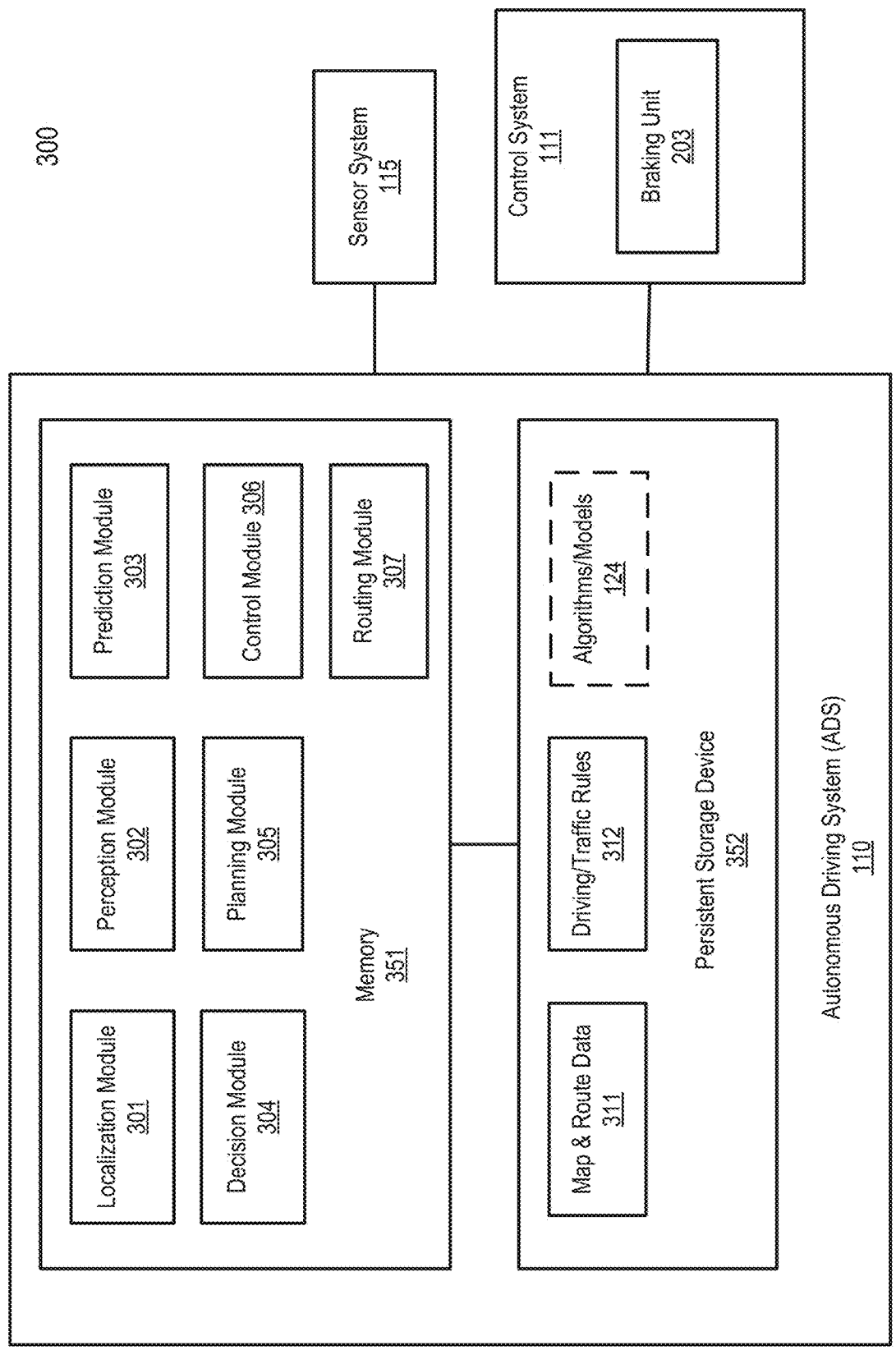
FIGS. 3A & 3B are block diagrams illustrating an example of an autonomous driving system used with an autonomous driving vehicle, according to embodiments of the present disclosure.
Figure 3B:
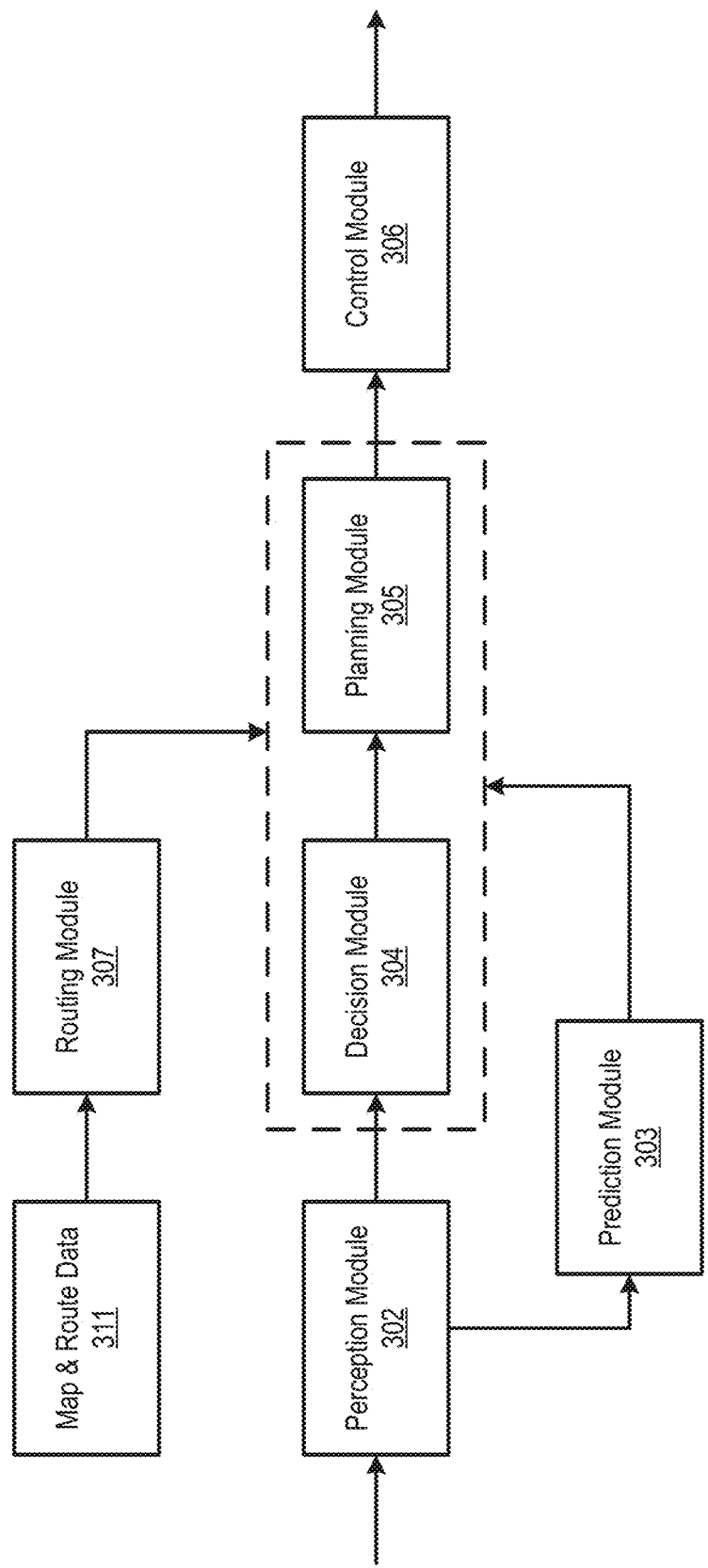

FIGS. 3A and 3B are block diagrams illustrating an example of an autonomous driving system used with an ADV, according to embodiments of the present disclosure. System 300 may be implemented as a part of ADV 101 of FIG. 1 including, but is not limited to, ADS 110, control system 111, and sensor system 115. Referring to FIGS. 3A and 3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip-related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception may include the lane configuration, traffic light signals, a relative position of another vehicle, a pedestrian, a building, a crosswalk, or other traffic-related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects may include traffic signals, roadway boundaries, other vehicles, pedestrians, and/or obstacles, etc. The computer vision system may use object recognition methods, video tracking, and other computer vision techniques. In one or more embodiments, the computer vision system maps an environment, tracks objects, and estimates the speed of objects, etc. Perception module 302 may also detect objects based on other sensor data provided by other sensors such as a radar and/or LIDAR.

For each of the objects, prediction module 303 predicts how the object will behave under the circumstances. The prediction may be performed based on the perception data perceiving the driving environment at the point in time in view of a set of map/route information 311 and traffic rules 312. For example, if the object is a vehicle at an opposing direction and the current driving environment includes an intersection, prediction module 303 may predict whether the vehicle is likely to move straight forward or make a turn. If the perception data indicates that the intersection has no traffic light, prediction module 303 may predict that the vehicle may have to fully stop prior to entering the intersection. If the perception data indicates that the vehicle is currently at a left-turn-only lane or a right-turn-only lane, prediction module 303 may predict that the vehicle is more likely to make a left turn or right turn, respectively.

For each of the objects, decision module 304 may make a decision regarding how to handle the object. For example, for a particular object (e.g., another vehicle in a crossing route) as well as its metadata describing the object (e.g., a speed, direction, turning angle, etc.), decision module 304 may decide how to encounter the object (e.g., overtake, yield, stop, pass, etc.). Decision module 304 may make such decisions according to a set of rules, such as traffic rules or driving rules 312, which may be stored in persistent storage device 352.

In one or more embodiments, routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic conditions. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. In one or more embodiments, the planning and control data include sufficient information to drive the vehicle from a first point to a second point of a route or path using appropriate vehicle settings or driving parameters (e.g., throttle, braking, steering commands, etc.) at different points in time along the path or route.

In one or more embodiments, the planning phase is performed in a number of planning cycles, also referred to as driving cycles, such as, for example, in every time interval of 100 milliseconds (ms). For each of the planning cycles or driving cycles, one or more control commands may be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one or more embodiments, planning module 305 plans a route segment or path segment for the next predetermined period of time such as 5 seconds. For each planning cycle, planning module 305 plans a target position for the current cycle (e.g., the next 5 seconds) based on a target position planned in a previous cycle. Control module 306 may then generate one or more control commands (e.g., throttle, brake, steering control commands, etc.) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system may incorporate data from a GPS system and one or more maps so as to determine the driving path for the ADV.

Figure 4A:
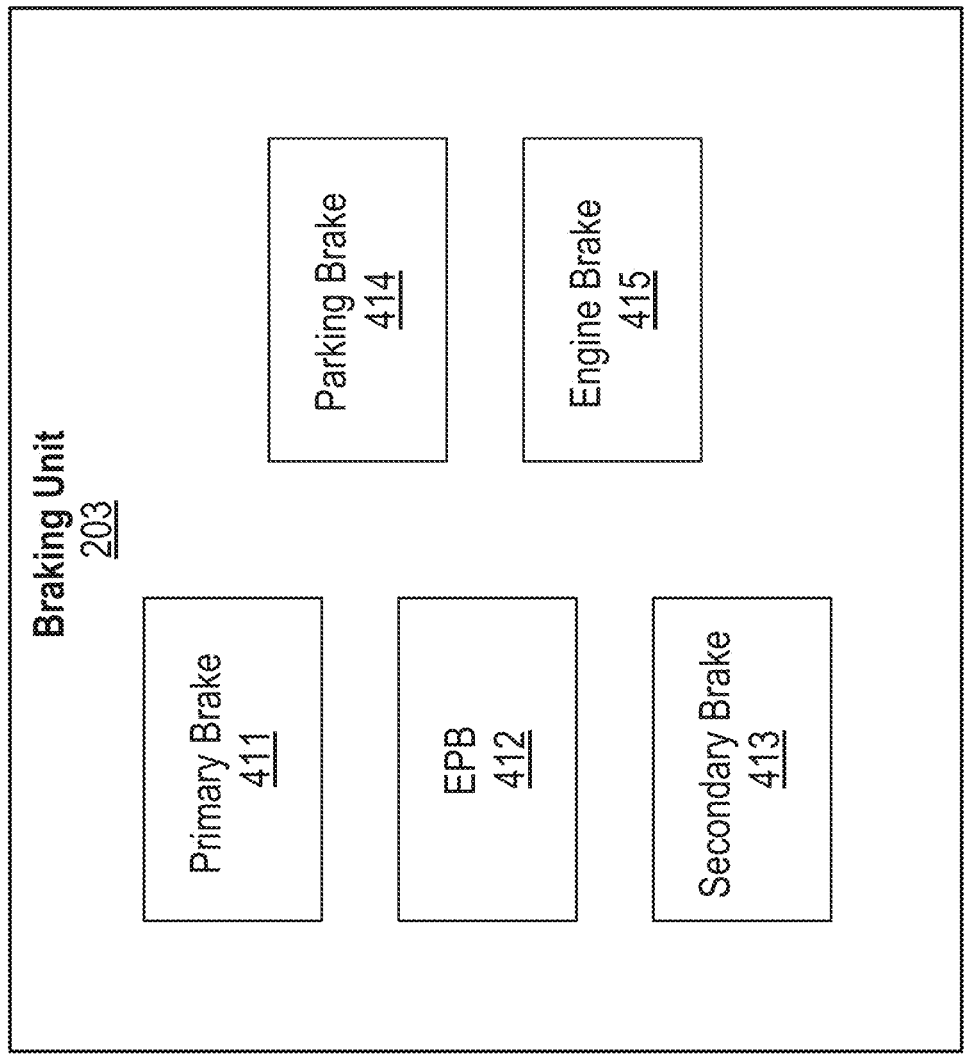
FIGS. 4A & 4B are block diagrams illustrating an example of a braking unit of a control system of an autonomous driving vehicle, according to embodiments of the present disclosure.
Figure 4B:
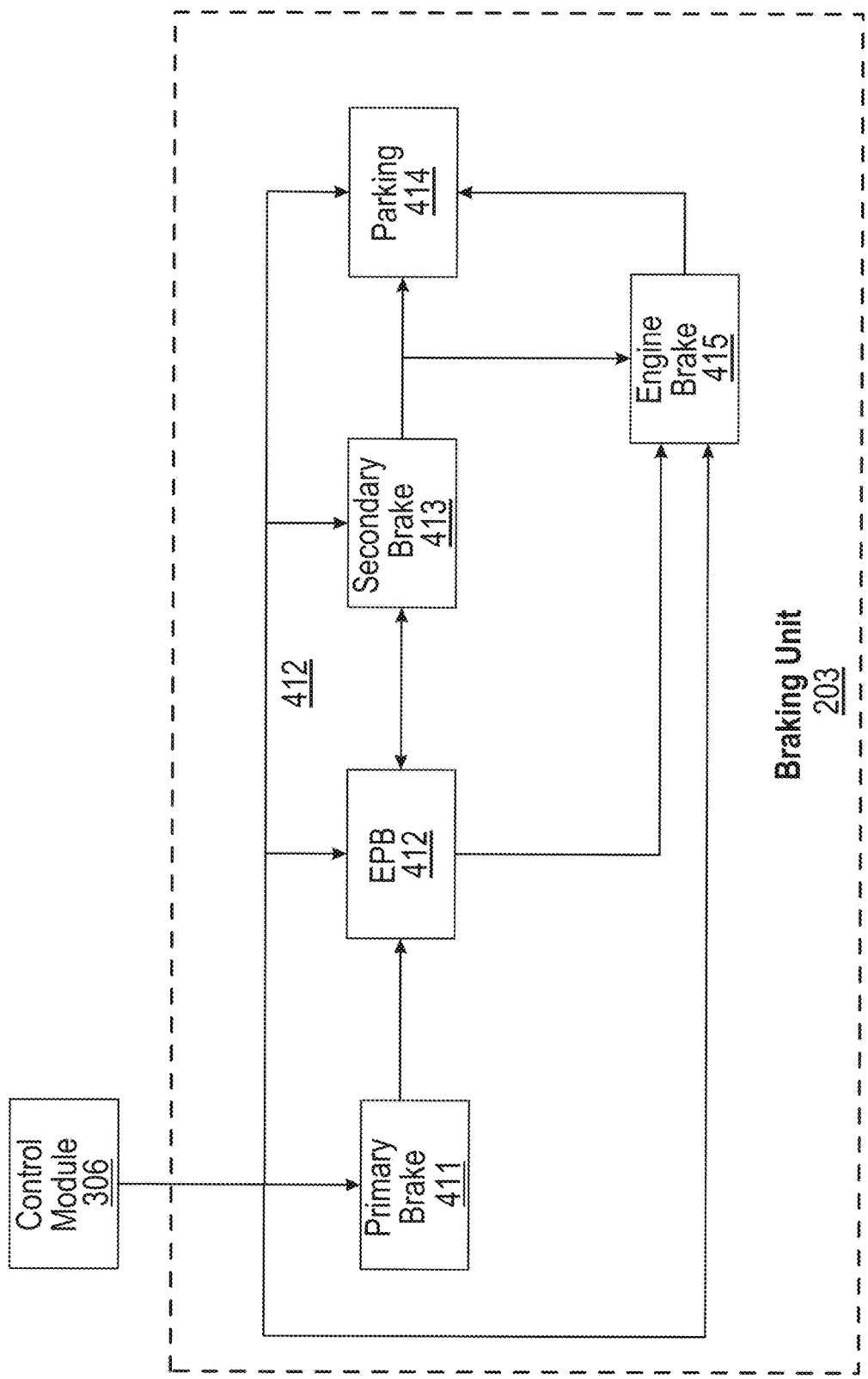

FIGS. 4A and 4B are block diagrams illustrating an example of a braking unit of a control system of an autonomous driving vehicle, according to embodiments of the present disclosure. Referring to FIG. 4A, braking unit 203 includes, but is not limited to, primary brake 411, EPB 412, secondary brake 413, parking 414, and/or engine brake 415. Some or all of brakes 411-415 may be implemented in hardware, software, or a combination thereof. Note that some or all of the brakes 411-415 may be communicatively coupled to or integrated with some or all of the other units of vehicle control system 111 in FIG. 2.

The primary brake 411 may control the speed of the ADV, stop the ADV, or hold the ADV to a standstill (remain stationary). The primary brake 411 may be the rear brakes, which may be used as the first defense to prevent the ADV from rolling. The primary brake 411 may be held safely, however, have the limitation of timeout. The EPB 412 may be activated with a button (instead of a lever) and the brake pads may be electrically applied to the wheels of the ADV. However, the speed of EPB 412 may be slow. The EPB may also have noise issues. The secondary brake 413 may be for use in the event of failure of the primary brake 411. The secondary brake 413 may be the front brakes, often pressure restricted in order to prevent the front wheels lockup and subsequent loss of steering. The secondary brake 413 may not be able to hold a big pressure for a time period exceeding a threshold, for example, 10 seconds. The secondary brake 413 may have noise issues. The parking brake 414 may keep a parked vehicle stationary, and the parking brake 414 may prevent the ADV from rolling down a hill or moving while at a standstill. However, it may not be safe for the parking brake 414 to hold too much weight. In one or more embodiments, the ADV cannot drive with the parking brake on, which may cause damage to the braking unit. The ADV may need to shift from the status of "parking," in which the parking brake is on, to the status of "drive," in which the parking brake is off, in order to drive. However, the shifting mechanism may be complex. In one or more embodiments, the engine brake 415 may be used to reduce the speed of the ADV. The engine brake 415 may be used as a last defense when all other brakes have failed.

Referring to FIG. 4B, the braking unit may be configured to perform a redundant holding control to balance the safety and the occupant or passenger comfort of the ADV. For example, the brake unit may be configured to hold the ADV on a slope. Different actions may be performed based on the vehicle status of the ADV. The control module 306 controls and drives the ADV, by sending proper commands or signals to vehicle control system 111 including the braking unit 203. The control module 306 and the brake unit 203 may perform the redundant holding control.

In one or more embodiments, when the ADV slips, the primary brake 411 may be used to add the wheel pressure, and a warning message (e.g., Message-1) may be generated. For example, the primary brake 411 may be used to add the wheel pressure below a first predetermined rate threshold based on the status of the ADV being in a first status and/or road conditions. For example, the status of the ADV may include a rolling speed of the ADV. The status of the ADV may include a distance between the ADV and an obstacle, for example, which may be the closest obstacle behind when the ADV is rolling back or the closest obstacle ahead of the ADV when the ADV is rolling forward. The status of the ADV may include a mass of the ADV, for example. The road condition may include the friction of the road, the slope gradient of the road, etc.

In one or more embodiments, the first status may include the rolling speed of the ADV being higher than zero and lower than a first predetermined speed threshold. For example, the first predetermined speed threshold V1 may be 0.1, 0.2, 0.5, or 1 kilometer per hour (kph) or other value. In one or more embodiments, the first status may include the distance between the ADV and the obstacle being larger than a first predetermined distance threshold. In one or more embodiments, the first status may include the mass of the ADV being less than a first predetermined mass threshold. In one or more embodiments, the first status may include the rolling speed of the ADV being higher than zero and lower than a first predetermined speed threshold, the distance between the ADV and the obstacle larger than the first predetermined distance threshold, and/or the mass of the ADV being less than the first predetermined mass threshold. The primary brake 411 may be used to add the wheel pressure slowly below a first predetermined rate threshold to consider the comfort and feeling of the occupant.

If the ADV continues to slip over with the status of the ADV being a second status, the EPB 412 may be activated, and a warning message (e.g., Message-2) may be generated. In one or more embodiments, the second status may include the rolling speed of the ADV being higher than the first predetermined speed threshold and lower than a second predetermined speed threshold, the distance between the ADV and the obstacle less than the first predetermined distance threshold and larger than a second predetermined distance threshold.

If the primary brake 411 fails or the EBP 412 fails, the secondary brake 413 may be activated with the status of the ADV being a third status, and a warning message (e.g., Message-3) may be generated. In one or more embodiments, the third status may include the rolling speed of the ADV being higher than the second predetermined speed threshold and lower than a third predetermined speed threshold, the distance between the ADV and the obstacle less than the second predetermined distance threshold and larger than a third predetermined distance threshold.

If the ADV comes to a standstill, parking 414 may be requested to help to hold the ADV. If all the brakes still cannot hold the ADV from rolling and the ADV is in a fourth status, the engine brake 415 may be used to reduce the crash damage, and a warning message (e.g., Message-4) may be generated. In one or more embodiments, the fourth status may include the rolling speed of the ADV being higher than the third predetermined speed threshold, the distance between the ADV and the obstacle less than the third predetermined distance threshold.

In another embodiment, the primary brake 411 may not be available. For example, the primary brake 411 may have problems. The secondary brake 413 may be activated, for example, the secondary brake 413 may be used to add the wheel pressure below a second predetermined rate threshold based on the status of the ADV and road conditions. If the ADV continues to slip over, the EPB 412 may be activated, for example when the rolling speed of the ADV exceeds the first predetermined speed threshold. If all the brakes still cannot hold the ADV from rolling, the engine brake 415 may be used to reduce the crash damage.

Figure 5:
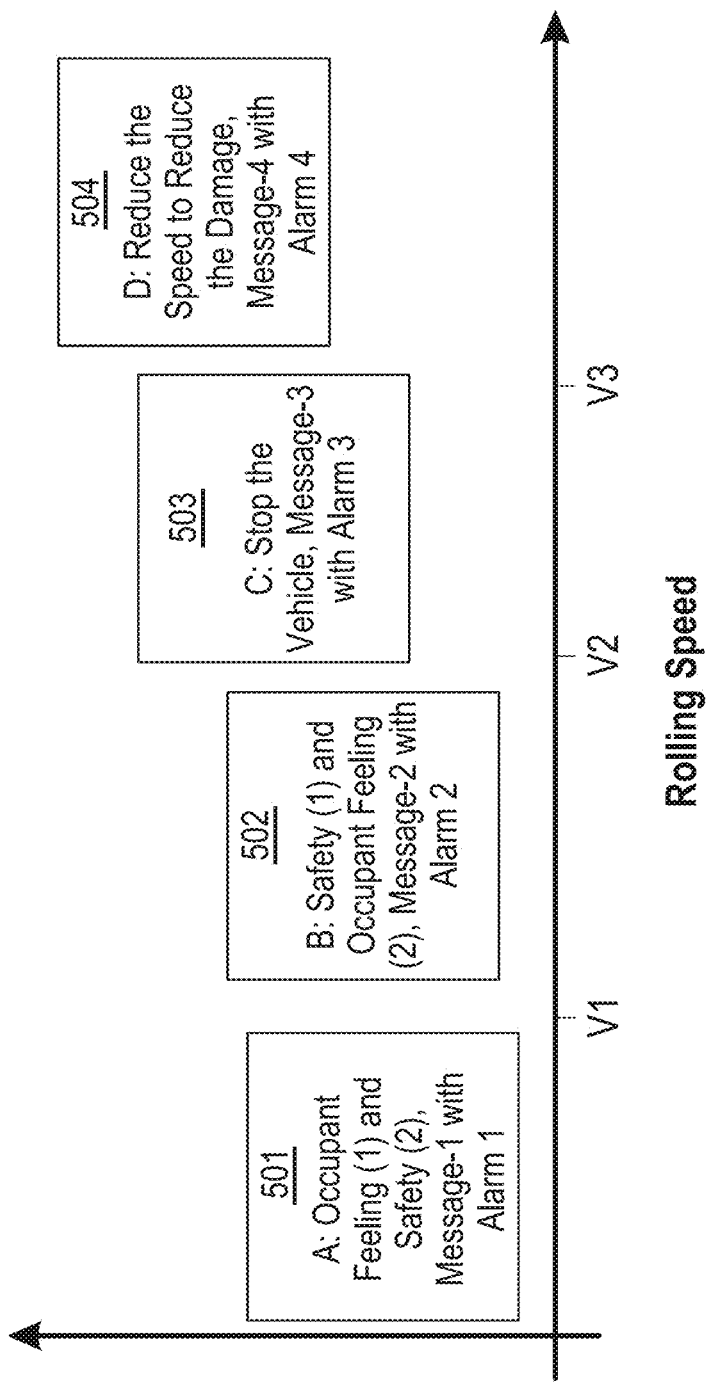
FIG. 5 is a diagram illustrating an example of a redundant holding control based on a status of an autonomous driving vehicle, according to embodiments of the present disclosure.

FIG. 5 is a diagram illustrating an example of a redundant holding control based on a status of an autonomous driving vehicle, according to embodiments of the present disclosure. By using the redundant holding control, not only the safety but also the comfort of the occupant or passenger of the ADV may be considered. In order to balance the safety and the occupant or passenger comfort, different stages of the redundant holding control may be determined based on the status of the ADV. Different actions may be performed based on the different stages.

Referring to FIG. 5, for example, the status of the ADV may be determined based on the rolling spend of the ADV. When initially detecting that the ADV is rolling, e.g., with the rolling speed higher than zero and lower than the first predetermined speed threshold V1, the status of the ADV may be determined to be in the first status. The redundant holding control may be in a first stage 501 based on the first status of the ADV. In the first stage 501, the occupant feeling may be considered first, and the safety may be considered second. The primary brake may be used to add the wheel pressure slowly, below the first predetermined rate threshold, and the warning message (e.g., Message-1) may be generated with a first level of warning. For example, the first level of warning may be slow flashing lights.

If the ADV continues to slip over with the rolling speed exceeding the first predetermined speed threshold V1 but lower than the second predetermined spend threshold V2, the status of the ADV may be determined to be in the second status. The redundant holding control may be in a second stage 502 based on the second status of the ADV. In the second stage 502, the safety may be considered first, and the occupant feeling may be considered second. The EPB may be activated, and a warning message (e.g., Message-2) may be generated with a second level of warning. For example, the second level of warning may be rapid flashing lights. The second level of warning may be higher than the first level of warning.

If the primary brake fails, or the EBP fails, the ADV continues to slip over with the rolling speed exceeding the second predetermined threshold V2 but lower than a third predetermined threshold V3, the status of the ADV may be determined to be in the third status. The redundant holding control may be in a third stage 503 based on the third status of the ADV. In the third stage 503, it is important to stop the ADV, and safety is considered. Thus, the secondary brake may be activated, and a warning message (e.g., Message-3) may be generated with a third level of warning. For example, the third level of warning may be sounds and fast flashing lights. The third level of warning may be higher than the second level of warning.

If the ADV comes to a standstill, parking may be requested to help to hold the ADV. If all the brakes still cannot hold the ADV from rolling, the ADV continues to roll back with the rolling speed exceeding the third predetermined threshold V3, and the status of the ADV may be determined to be in the fourth status. The redundant holding control may be in a fourth stage 504 based on the fourth status of the ADV. In the fourth stage 504, it is important to reduce the speed of the ADV to reduce the crash damage since the ADV may be about to crash into an obstacle. Thus, the engine brake may be activated to reduce the crash damage, and a warning message (e.g., Message-4) may be generated with a fourth level of warning. For example, the fourth level of warning may be a loud alarm sound and rapidly flashing lights. The fourth level of warning may be higher than the third level of warning.

Figure 6A:
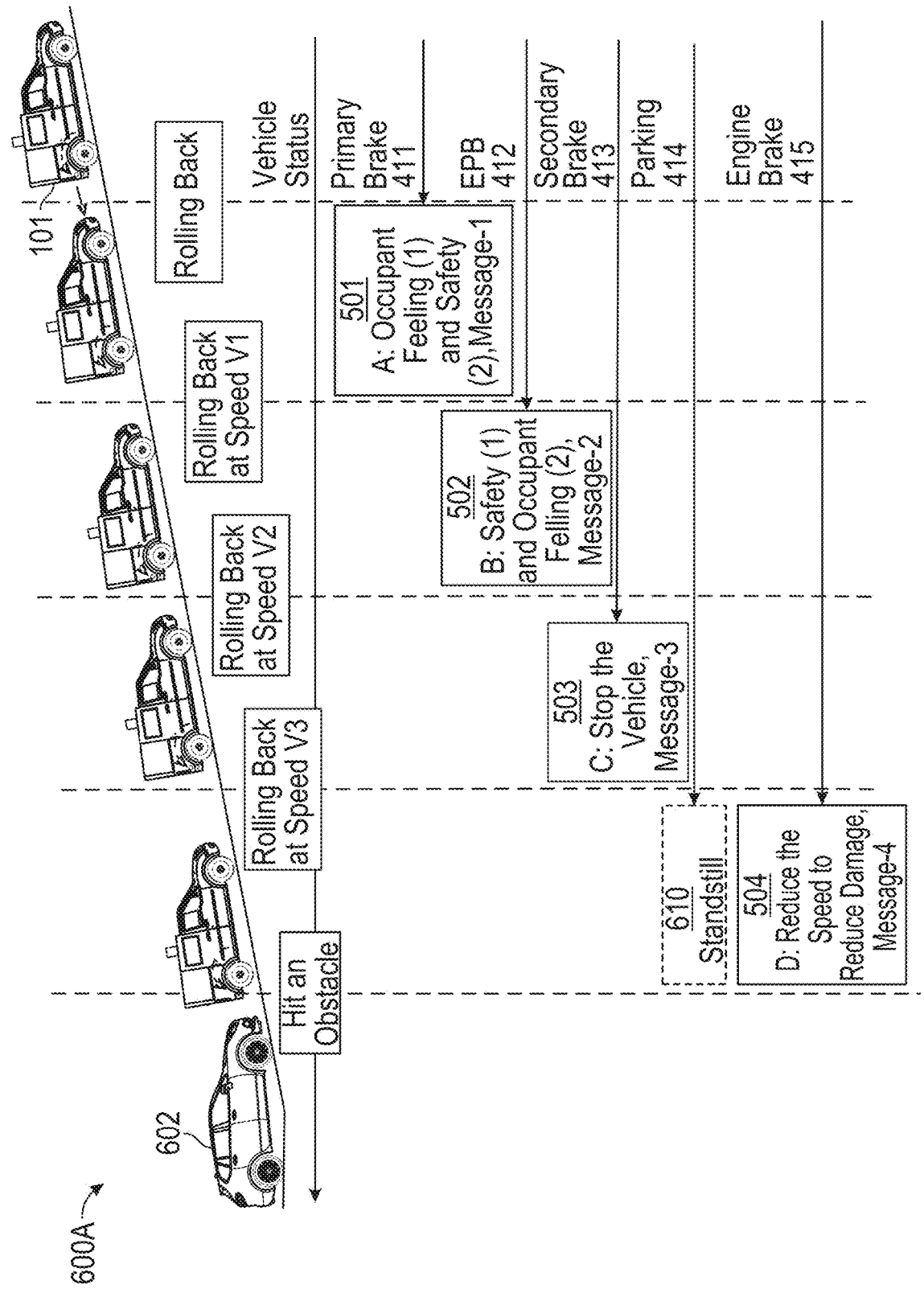
FIG. 6A is a diagram illustrating an example of a redundant holding control to prevent rolling of an autonomous driving vehicle, according to embodiments of the present disclosure.

FIG. 6A is a diagram 600A illustrating an example of a redundant holding control to prevent rolling of the autonomous driving vehicle 101, according to embodiments of the present disclosure. In the redundant holding control, not only the safety but also the comfort of the occupant or passenger of the ADV may be considered. In order to balance the safety and the occupant or passenger comfort, different holding control actions by different brakes may be performed at different stages based on the status of the ADV 101.

Referring to FIG. 6A, ADV 101 may be supposed to be held to a standstill. Initially, the sensors of the ADV 101 may detect that the ADV 101 is rolling back in the first status, e.g., with the rolling speed higher than zero and lower than the first predetermined speed threshold V1, and/or an obstacle 602 is at a distance larger than the first predetermined distance threshold. For example, the first predetermined speed threshold V1 may be 0.1, 0.2, 0.5, or 1 kilometers per hour (kph) or other value. The predetermined distance threshold may be 5, 10, 15, 20 meters, or other value. Based on the first status of ADV 101, the redundant holding control may be in the first stage 501, in which the occupant feeling may be considered first, and the safety may be considered second. The primary brake 411 may be used to add the wheel pressure slowly, for example, below a first predetermined rate threshold R1 (Newton×meters per second (Nm/s), MegaPascals per second (MPa/s), etc.). The control system of the ADV may generate a first warning message (e.g., Message-1), for example, with slow flashing lights.

If the ADV 101 continues to roll back with the rolling speed exceeding the first predetermined speed threshold V1 but lower than the second predetermined speed threshold V2, the status of the ADV may be changed to be in the second status. Based on the second status of the ADV 101, the redundant holding control may be in the second stage 502, in which safety may have priority over the occupant feeling. For example, the second predetermined speed threshold may be 1, 1.5, 2 kph, or other value. The EPB 412 may be activated to try to hold the ADV 101. The control system of the ADV may generate a second warning message (e.g., Message-2), for example, with fast flashing lights.

If the primary brake or the EBP fails, the ADV 101 still continues to roll back with the rolling speed exceeding the second predetermined threshold V2 but lower than the third predetermined threshold V3, the status of the ADV may be changed to be in the third status. Based on the third status of the ADV 101, the redundant holding control may be in the third stage 503, in which the secondary brake 413 may be activated to try to quickly stop the ADV 101 since the situation may be dangerous. For example, the second predetermined speed threshold may be 2, 3, 4, or 5 kph or other value. The control system of the ADV may generate a third warning message (e.g., Message-3), for example, with a loud voice and rapid flashing lights. If the ADV 101 comes to a standstill, the parking brake 414 may be activated to hold the ADV, as illustrated in 610.

If all the brakes still cannot hold the ADV 101 from rolling, the ADV 101 continues to roll back with the rolling speed exceeding the third predetermined threshold V3. The ADV 101 may be close to the obstacle 602 and about to hit the obstacle 602, e.g., the obstacle behind. The status of the ADV may be changed to be in the fourth status. Based on the fourth status of the ADV 101, the redundant holding control may be in the fourth stage 504, in which the engine brake 415 may be activated to reduce the crash damage. The control system of the ADV may generate a fourth warning message (e.g., Message-4), for example, with alarming sound and rapidly flashing lights.

Figure 6B:
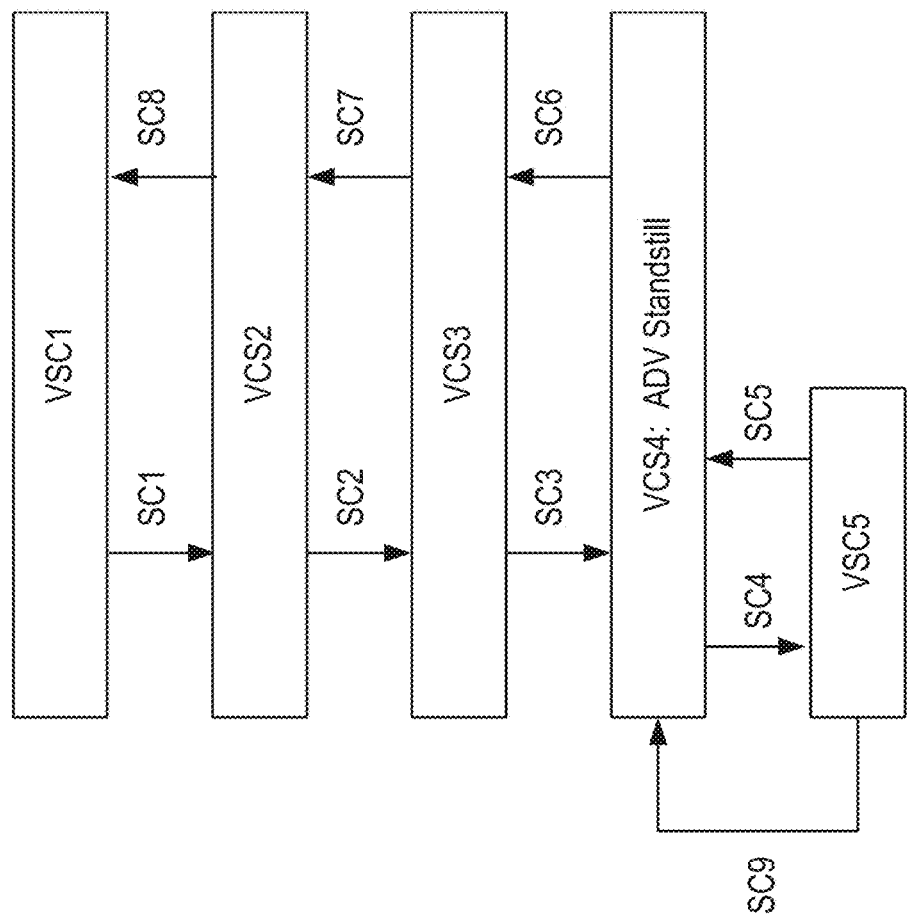
FIG. 6B illustrates a state diagram of an autonomous driving vehicle using a redundant holding control, according to embodiments of the present disclosure.

FIG. 6B illustrates a state diagram 600B of an autonomous driving vehicle using a redundant holding control, according to embodiments of the present disclosure. One or more wheel sensors may be used to detect a very low speed of the ADV when the ADV initially starts rolling. The wheel sensors may generate magnetic pulses in the form of waves, proportional to the speed of the ADV. The ADV may be in different states based on the speed of the ADV, and different holding control techniques may be applied accordingly.

Referring to FIG. 6B, the ADV 101 may be held to a standstill at a state VCS4. One or more of the ADV's wheel sensors, which may be located at each of the wheels (i.e., front left (FL), front right (FR), rear left (RL), rear right (RR) wheel), may be used to detect the rolling speed of the ADV based on pulses detected. In one or more embodiments, when at least two diagonal wheel sensors (e.g., FL & RR or FR & RL) may detect pulses within a first time period, a trigger SC4, where "SC" stands for "status condition," may happen, in which the ADV may change to the state VCS5, where "VCS" stands for "vehicle control state" or "vehicle condition status," in which the ADV is rolling. For example, the first time period may be 250 ms, 350 ms, 450 ms, 550 ms, 650 ms, or another value. A trigger SC6 from the state VCS4 to a state VCS3 may not be allowed.

While in the state VCS5, when no wheel sensors may detect any pulses for a second period of time, a trigger SC5 may happen, in which the ADV may change back to the state VCS4. However, when the rolling speed is larger than a first speed (e.g., 0.5, 1, or 1.5 kph), a trigger SC9 may happen, in which the state of the ADV may change to the state VCS3. For example, the second time period may be 50 ms, 150 ms, 250 ms, 350 ms, 450 ms, or another value.

While in the state VCS3, when no wheel-sensors may detect any pulses for the second period of time, a trigger SC3 may happen, in which the ADV may change back to the state VCS4; when the rolling speed is larger than a second speed (e.g., 1.5, 2, or 2.5 kph), a trigger SC7 may happen, in which the state of the ADV may change to a state VCS2.

While in the state VCS2, when the rolling speed is less than the second speed (e.g., 1.5, 2, or 2.5 kph), a trigger SC2 may happen, in which the ADV may change back to the state VCS3; when the rolling speed is larger than a third speed (e.g., 5, 6, 7, 8, 9, or 10 kph), a trigger SC8 may happen, in which the state of the ADV may change to a state VCS1. While in the state VCS1, when the rolling speed is less than a fourth speed (e.g., 2, 3, or 4 kph), a trigger SC1 may happen, in which the ADV may change back to the state VCS2.

Different brakes may be activated based on different states of the ADV. For example, when the ADV is at the state VSC5, the redundant holding control may be in the first stage 501, and the primary brake 411 may be used. When the ADV is at the state VSC3, the redundant holding control may be in the second stage 502, and the EPB 412 may be activated. When the ADV is at the state VSC2, the redundant holding control may be in the third stage 503, in which the secondary brake 413 may be activated. When the ADV is at the state VSC1, the redundant holding control may be in the fourth stage 504, and the engine brake 415 may be activated.

Figure 7A:
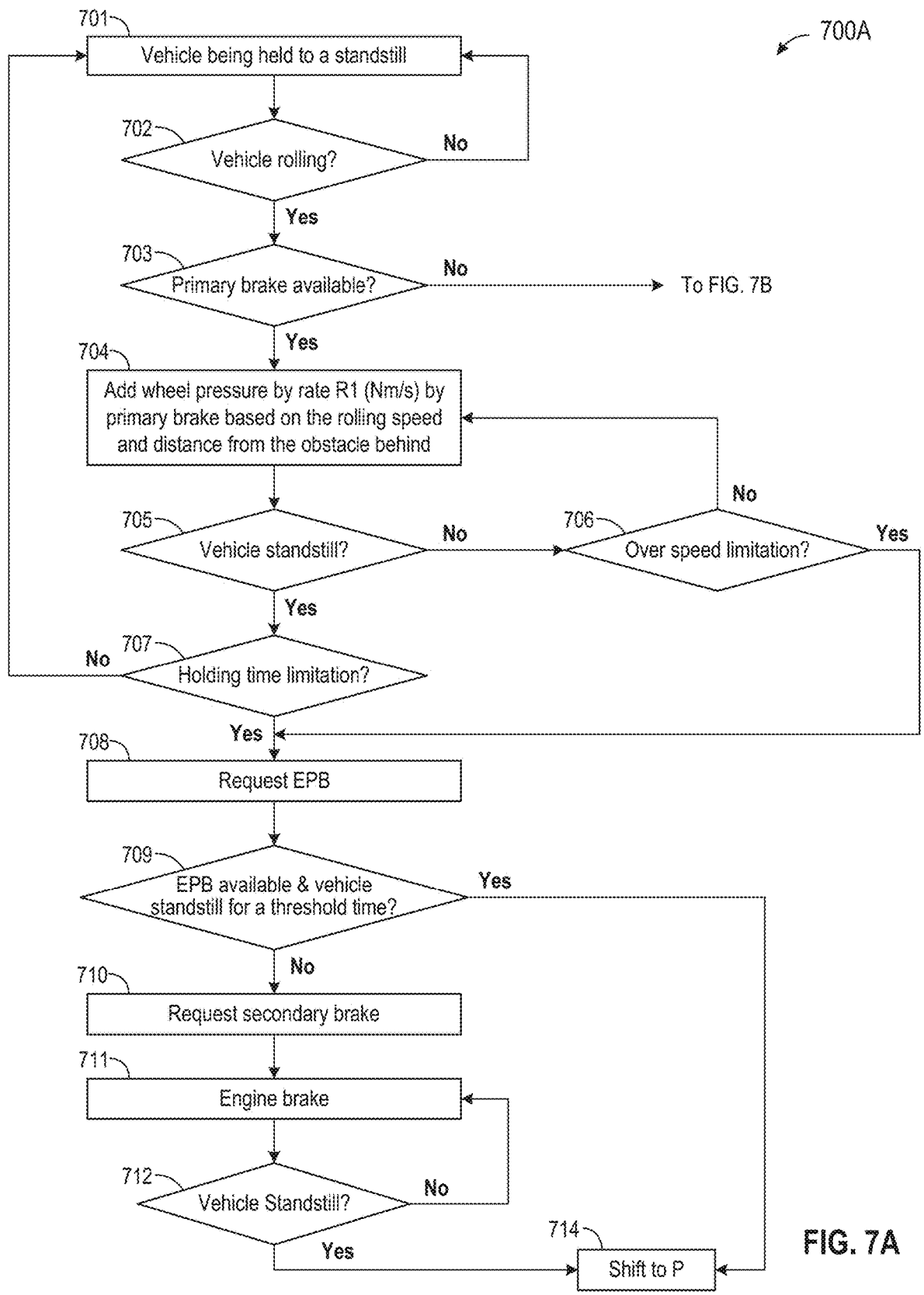
FIGS. 7A & 7B are flow diagrams illustrating an example of using a redundant holding control of an autonomous driving vehicle, according to embodiments of the present disclosure.
Figure 7B:
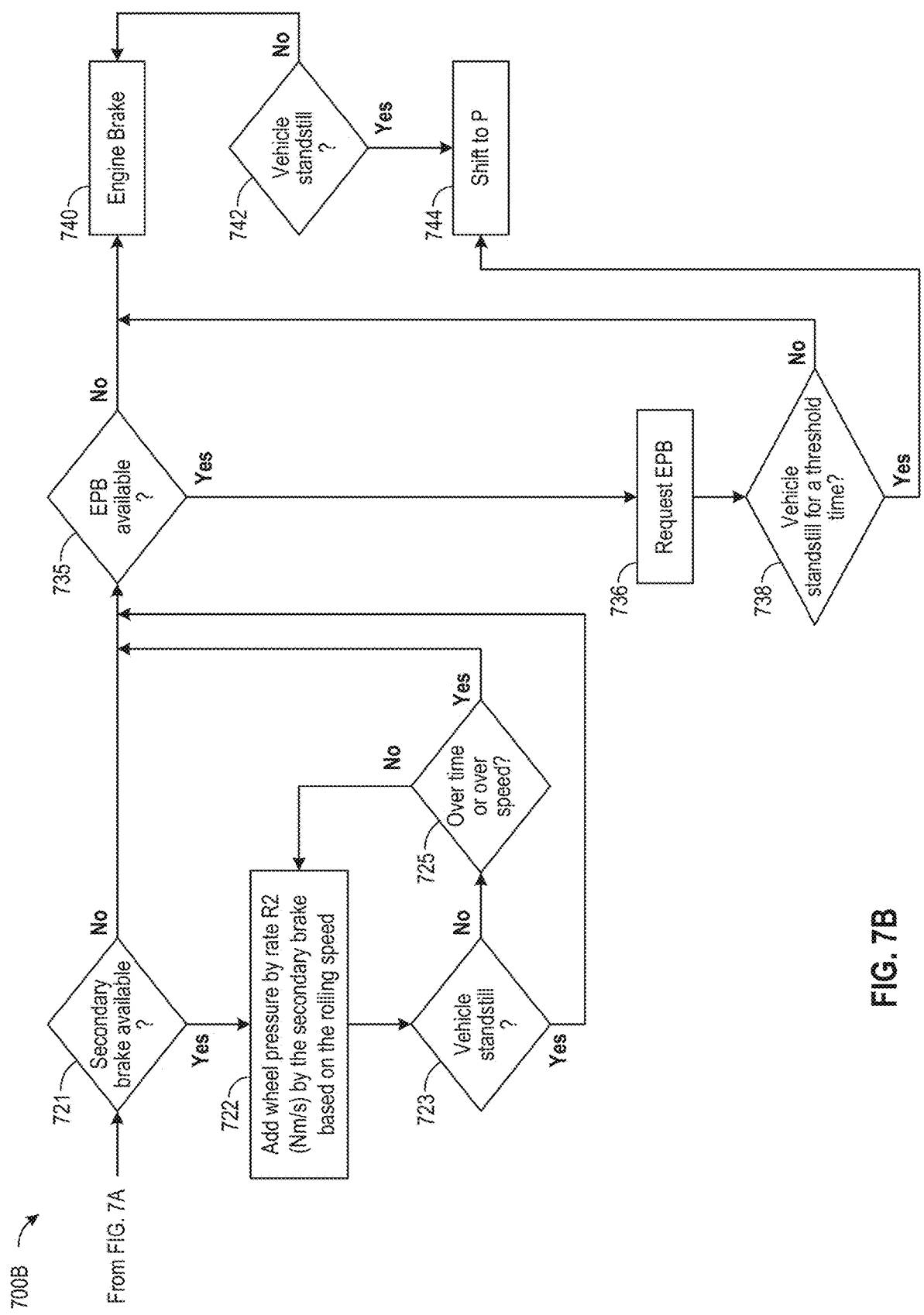

FIGS. 7A and 7B are flow diagrams illustrating an example of using a redundant holding control of an autonomous driving vehicle, according to embodiments of the present disclosure. By using the redundant holding control, both the safety and the comfort of the passenger of the ADV may be considered.

Referring to FIG. 7A, at block 701, the ADV 101 may be supposed to be held to a standstill. At block 702, the sensors of the ADV 101 may detect the rolling speed of the ADV to determine if the ADV is rolling. At block 703, if the sensors may detect the ADV is rolling, whether the primary brake is available may be determined.

At block 704, when the primary brake is available, the primary brake may be used to add the wheel pressure slowly, for example, below the first predetermined rate threshold R1 (Nm/s) based on the rolling speed lower than the first predetermined speed threshold V1 and/or the distance from the closest obstacle behind larger the first predetermined distance threshold. The situation when the primary brake is not available will be discussed in FIG. 7B.

At block 705, whether the ADV is at a standstill may be determined. At block 706, if the ADV is not at a standstill, whether the rolling speed is larger than the first predetermined speed threshold V1 may be determined. At block 707, if the ADV is at a standstill, whether the holding time limitation of the primary brake is reached may be determined.

At block 708, if the rolling speed exceeds the first predetermined speed threshold V1 or the holding time limitation of the primary brake is reached, the EPB may be requested or activated to hold the ADV.

At block 709, whether the EPB is available and the ADV is at a standstill for a predetermined threshold time may be determined. For example, the predetermined threshold time may be 1, 2, 3, 4, 5, 10 minutes, or other value. If the EPB is available (e.g., being activated) and the ADV is at a standstill for the predetermined threshold time, the parking may be activated by shifting to "park", as illustrated in block 714.

At block 710, if the ADV is not at a standstill for the predetermined threshold time, for example, the ADV still continues to roll, the secondary brake may be requested and/or activated to stop the ADV.

At block 711, if all the above brakes still cannot hold the ADV from rolling, the engine brake may be activated/used to reduce the crash damage. At block 712, whether the ADV is at a standstill may be determined. At block 714, if the ADV is at a standstill, the parking may be activated by shifting to "park".

Referring to FIG. 7B, at block 721, in the situation when the primary brake is not available, whether the secondary brake is available may be determined. At block 722, when the secondary brake is available, the secondary brake may be activated/used to add the wheel pressure below the second predetermined rate threshold R2 (Nm/s) based on the rolling speed lower than the first predetermined speed threshold V1 and/or the distance from the closest obstacle behind larger the first predetermined distance threshold. As discussed above in connection with FIG. 6A, the first predetermined speed threshold V1 may be 0.1, 0.2, 0.5, or 1 kilometers per hour (kph) or other value.

At block 723, whether the ADV is at a standstill may be determined. If the ADV is at a standstill, the ADV may determine whether the EPB is available, as illustrated at block 735. If the ADV is not at a standstill, whether the rolling speed exceeds the first predetermined speed threshold V1 or the holding time limitation of the secondary brake is reached may be determined, as illustrated at block 725. If the rolling speed does not exceed the first predetermined speed threshold V1 and the holding time limitation of the secondary brake is not reached, the ADV may go back to the operation at block 722 by adding the wheel pressure below the second predetermined rate threshold. If the rolling speed exceeds the first predetermined speed threshold V1 or the holding time limitation of the secondary brake is reached, the ADV may determine whether the EPB is available, as illustrated at block 735.

At block 736, if the EPB is available, the EPB may be requested or activated. At block 738, whether the ADV is at a standstill for a predetermined threshold time may be determined. For example, the predetermined threshold time may be 1, 2, 3, 4, 5, 10 minutes, or other value. If the ADV is at a standstill for the predetermined threshold time, the parking may be activated by shifting to "park", as illustrated in block 744.

At block 740, if the ADV is not at a standstill for the predetermined threshold time (e.g., the EPB still cannot hold the ADV) or the EPB is not available, the engine brake may be activated to reduce the crash damage. At block 742, whether the ADV is at a standstill may be determined. If the ADV is not at a standstill, the engine brake may be continued to be activated. At block 744, if the ADV is at a standstill, the parking may be activated by shifting to "park".

Figure 8:
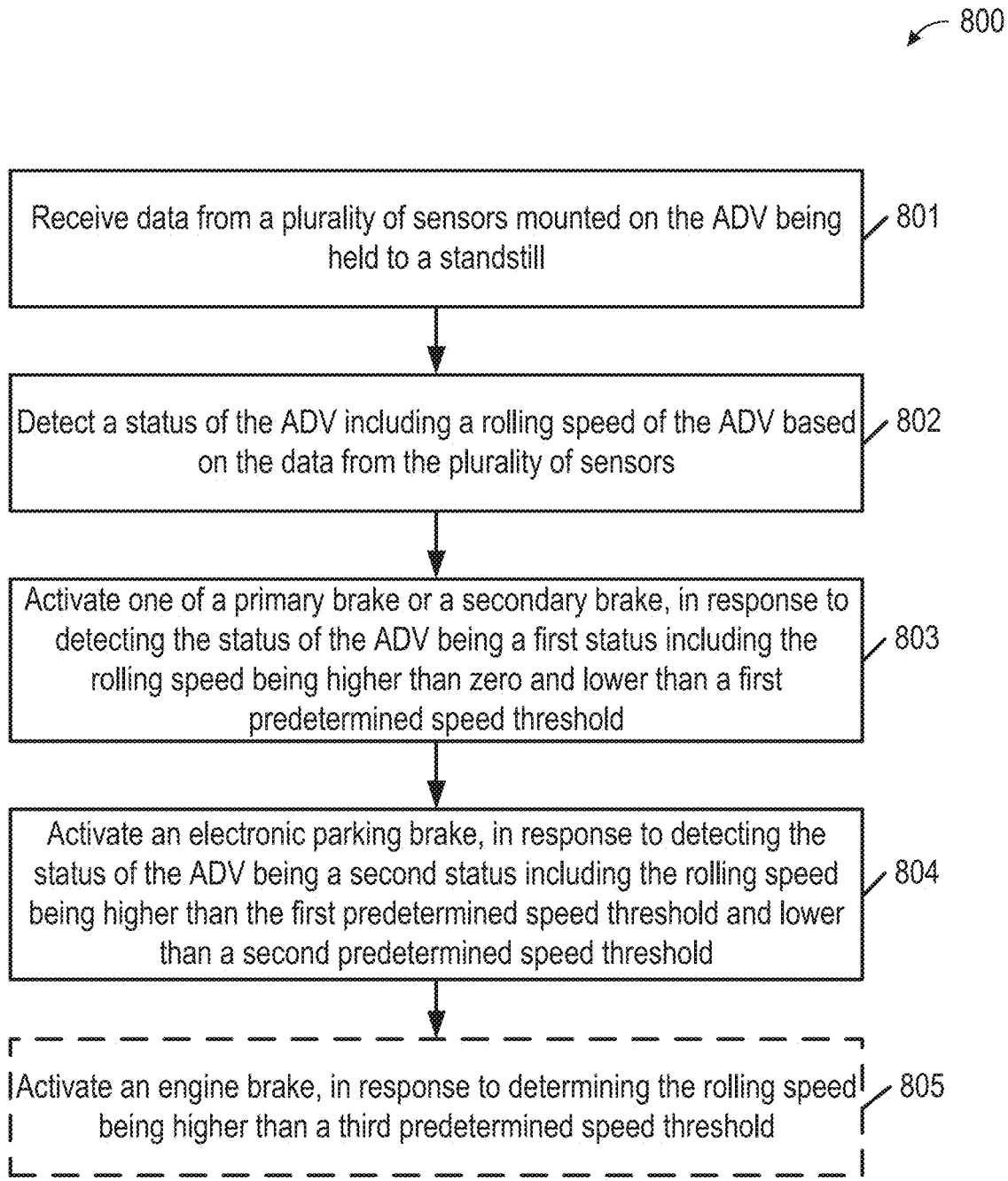
FIG. 8 is a flow diagram illustrating an example of a process of performing a redundant holding control to prevent rolling of an autonomous driving vehicle, according to embodiments of the present disclosure.

FIG. 8 is a flow diagram illustrating an example of a process 800 of performing a redundant holding control to prevent rolling of an autonomous driving vehicle, according to embodiments of the present disclosure. Process 800 may be performed by processing logic which may include software, hardware, or a combination thereof. For example, process 800 may be performed by the control module 306 and the brake unit 203, as illustrated in FIG. 4B. Referring to FIG. 8, in operation 801, processing logic receives data from a plurality of sensors mounted on the ADV being held at a standstill.

In operation 802, processing logic detects a status of the ADV including a rolling speed of the ADV based on the data from the plurality of sensors.

In operation 803, processing logic activates one of a primary brake or a secondary brake, in response to detecting the status of the ADV being a first status including the rolling speed being higher than zero and lower than a first predetermined speed threshold.

In operation 804, processing logic activates an electronic parking brake, in response to detecting the status of the ADV being a second status including the rolling speed being higher than the first predetermined speed threshold and lower than a second predetermined speed threshold.

In one or more embodiments, processing logic may determine whether the primary brake is available in response to detecting the rolling speed being higher than zero. In one or more embodiments, processing logic may activate the primary brake in response to determining that the primary brake is available. In one or more embodiments, processing logic may activate the primary brake including applying a wheel pressure below a predetermined rate threshold. In one or more embodiments, processing logic may activate the secondary brake, in response to determining the status of the ADV being a third status including the rolling speed being higher than the second predetermined speed threshold and lower than a third predetermined speed threshold. In one or more embodiments, processing logic may activate an engine brake, in response to determining the status of the ADV being a fourth status including the rolling speed being higher than the third predetermined speed threshold, as illustrated in operation 805. In one or more embodiments, processing logic may activate a parking brake, in response to determining the rolling speed being zero.

In one or more embodiments, processing logic may activate the secondary brake in response to determining that the primary brake is not available. In one or more embodiments, processing logic may activate the secondary brake including applying a wheel pressure below a predetermined rate threshold. In one or more embodiments, processing logic may activate an engine brake, in response to determining the rolling speed being higher than the second predetermined speed threshold.

In one or more embodiments, processing logic may generate a first warning message with a first level of warning in response to detecting the status of the ADV being the first status. In one or more embodiments, processing logic may generate a second warning message with a second level of warning in response to detecting the status of the ADV being the second status, where the second level of warning is higher than the first level of warning. In one or more embodiments, processing logic may generate a third warning message with a third level of warning in response to detecting the status of the ADV being a third status including the rolling speed being higher than the second predetermined speed threshold and lower than a third predetermined speed threshold, where the third level of warning is higher than the second level of warning. In one or more embodiments, processing logic may generate a fourth warning message with a fourth level of warning in response to detecting the status of the ADV being a fourth status including the rolling speed being higher than the third predetermined speed threshold, where the fourth level of warning is higher than the third level of warning.

By this process, both the safety and the comfort of the occupant or passenger of the ADV may be considered. Different actions may be performed according to different stages of the redundant holding control based on the status of the ADV, thereby balancing the safety and the comfort of the occupant or passenger of the ADV.

B. Embodiments of ADV Smooth Drive-Off from a Standstill

As noted above, smooth and agile acceleration of an ADV that is being held at a standstill or is otherwise at a stop is important for ADV safety, efficiency, and occupant enjoyment. But, accelerating from a stopped position (also known as "drive off") is a complex matter. The ADV cannot move forward immediately even though the ADV's control system initiates an acceleration command because of an excess of residual brake torque. Also, if the brake torque is released too quickly, there may be an uncomfortable acceleration (e.g., a sudden jerk forward) or slipping if propulsion torque is applied to quickly.

Accelerating from a stop for an ADV requires considering a number of factors. Consider, by way of example, an ADV that is stopped at an intersection, particularly an uncontrolled intersection in which there are no electronically controlled right-of-way indicators. FIGS. 9A and 9B depict an ADV 905 that is stopped at a 4-way stop intersection. FIG. 9A depicts a top view 900A, and FIG. 9B depicts a partial side view. Note that, in such situations, if the ADV has too slow of an acceleration from the stop position, another vehicle (e.g., vehicle 925) may proceed before the ADV even if it was properly the ADV's turn to advance through the intersection. In such a scenario, it is not uncommon for the ADV to be stuck at the intersection for a long time as successive drivers perceive the slow drive-off reaction of the ADV as the ADV yielding the right-of-way to them.

To add to the complexity, consider a situation in which the ADV 905 is stopped on a surface 915 with a significant positive slope angle, θ. The ADV must contend with the added force due to gravity pulling the ADV backward down the slope. Too much acceleration may cause slipping and too little acceleration may cause the ADV to roll back into a vehicle behind it (e.g., car 910). Thus, the ADV control system should disengage the brake in concert with engaging the engine torque in a coordinated and controlled manner. Ideally, the ADV should advance in a soft, agile, smooth, and safe manner from the stop regardless of the degree of angle, θ. Embodiments herein provide systems and methods to facilitate a pleasant and comfortable ride while having the ADV drive off smoothly (e.g., not a large jerk) and safely (e.g., not slipping) during driving from a stop-regardless of whether the ADV is on a slope or on a neutral (i.e., not sloped) surface.

Figure 10:
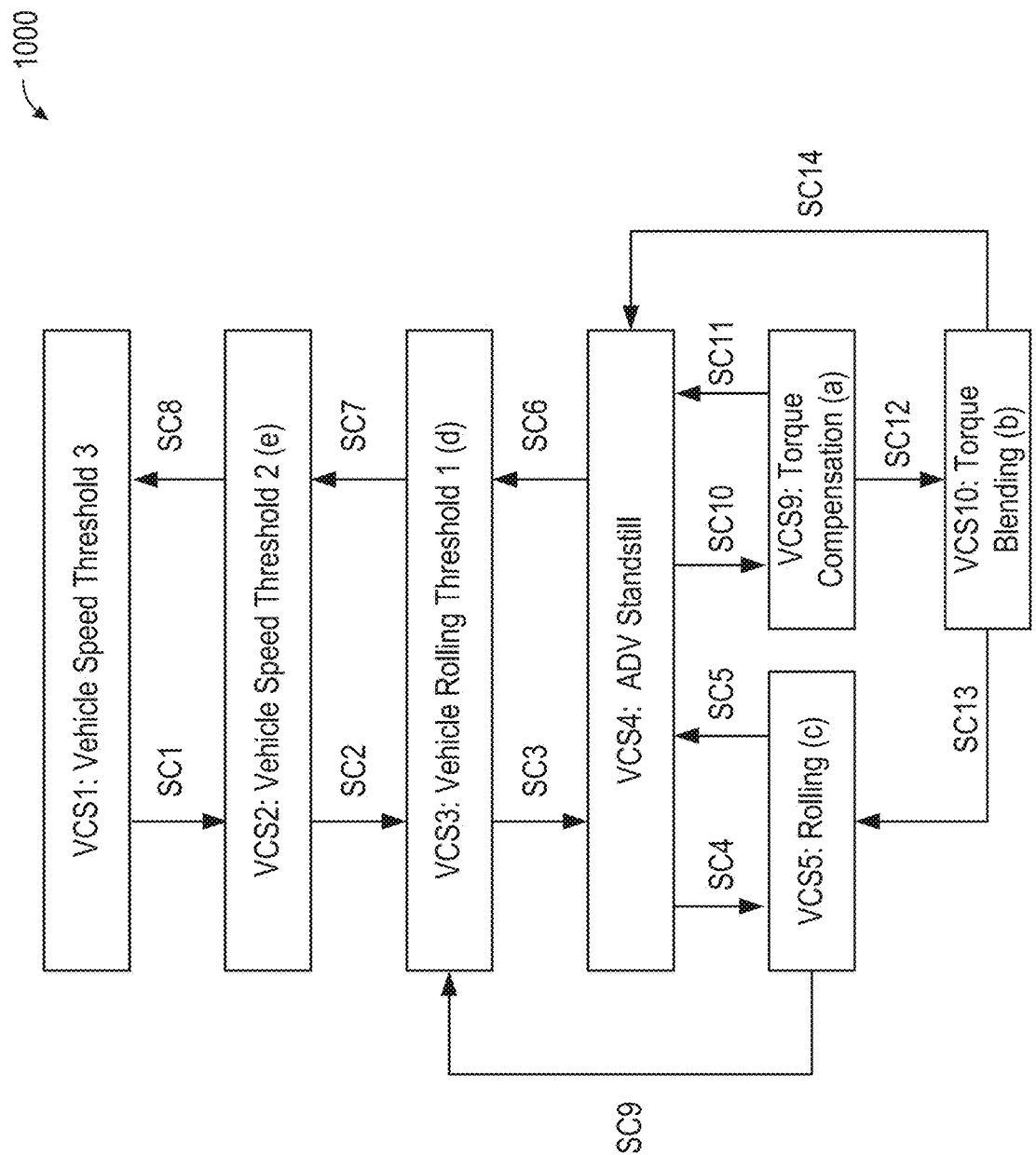
FIG. 10 depicts a state diagram 1000 for an ADV for drive-off control, particularly on a positive slope angle, according to embodiments of the present disclosure.

FIG. 10 depicts a diagram 1000 related to conditions for a controller of an ADV for implementing drive-off control, particularly on a positive slope angle, according to embodiments of the present disclosure. The depicted control flow 1000 may be implemented in a similar manner as discussed above with respect to FIG. 6B; however, it shall be noted that the embodiment depicted in FIG. 6B is used for different purposes (i.e., related to braking) than the embodiment depicted in FIG. 10, which is related to controls for drive-off, as discussed in more detail below; thus, it shall be noted that the values associated with FIG. 10 may be different than those associated with FIG. 6B even if the same descriptors and reference indicators are used. FIG. 10 is favorably viewed in conjunction with FIG. 11, which depicts examples of brake torque versus time 1100A and corresponding wheel torque versus time 1100B, according to embodiments of the present disclosure. It shall be noted that different brake-torque-vs-time profiles/functions and wheel-torque-vs-time profiles/functions may be applied.

Referring to FIG. 10, the ADV may be at a standstill or stop at a state VCS4. During this time period, the wheel torque may be zero 1101, and the brake torque may be at a level 1102 that is sufficient to maintain the ADV at a stop. In one or more embodiments, a drive-off request SC10 to drive-off/accelerate from the stopped or standstill state VCS4 is received (e.g., point 1105 in FIG. 11). The drive-off request SC10 may be received from (or generated by) user input or the ADS (e.g., ADS 110 or a module thereof, such as the planning module).

In one or more embodiments, the state VCS9 represents a torque compensation stage on a positive slope. Because some amount of gaps or play exists in all gearing, the torque compensation stage causes the gears to engage to begin to transfer torque, but typically there is no movement of the ADV yet. In one or more embodiments, during the VCS9 stage, the ADV may apply engine torque at a first drive-off torque rate (e.g., DTR1), which may be based upon wheel torque of the wheels and may be based upon the rate at which torque is to be applied. An example DTR1 value may be approximately 7300 Nm/s.

Note that, if the drive-off request is canceled (e.g., by a user or by the ADS planner module) while in the torque compensation stage VCS9, a trigger SC11 may occur, which puts the ADV back to the state VCS4. In the depicted embodiment in FIG. 11, the first drive-off torque rate is depicted as being linear; however, it shall be noted that different functions or models may be employed.

In one or more embodiments, once the ADV has reached a wheel torque threshold value (see point 1110 in FIG. 11), a trigger SC12 may cause the ADV to transition to the state VCS10, which may be referred to as the torque blending stage. The torque blending stage involves releasing the brake pressure smoothly while the wheel torque rises. In the embodiment depicted in FIG. 11, two actions may occur during the torque blending stage VCS10. One action that occurs during stage VCS10 is that the brakes on the ADV start 1103 to release braking pressure at a first brake release torque rate (e.g., BTR1), and the other action that occurs is that torque pressure may be applied at a second drive-off torque rate (e.g., DTR2), which may be based upon wheel torque of the wheels and may be based upon the rate at which torque is to be applied. An example DTR2 value may be approximately 1450 Nm/s. In one or more embodiments, BTR1 may be determined relative to DTR2. For example, in one or more embodiments, BTR1 may be determined as follows:

$$BTR1 = \phi \times DTR2; \text{ or}$$

$$BTR1 = F(DTR2)$$

where ϕ is a coefficient applied to DTR2 and F represents a function or machine learning model that determines BTR1 given DTR2 as an input. It shall be noted that F may take other inputs, including but not limited to vehicle mass, acceleration, speed, road conditions, etc. (which values may be preset or may be determined in real-time or near real-time).

Figure 11:
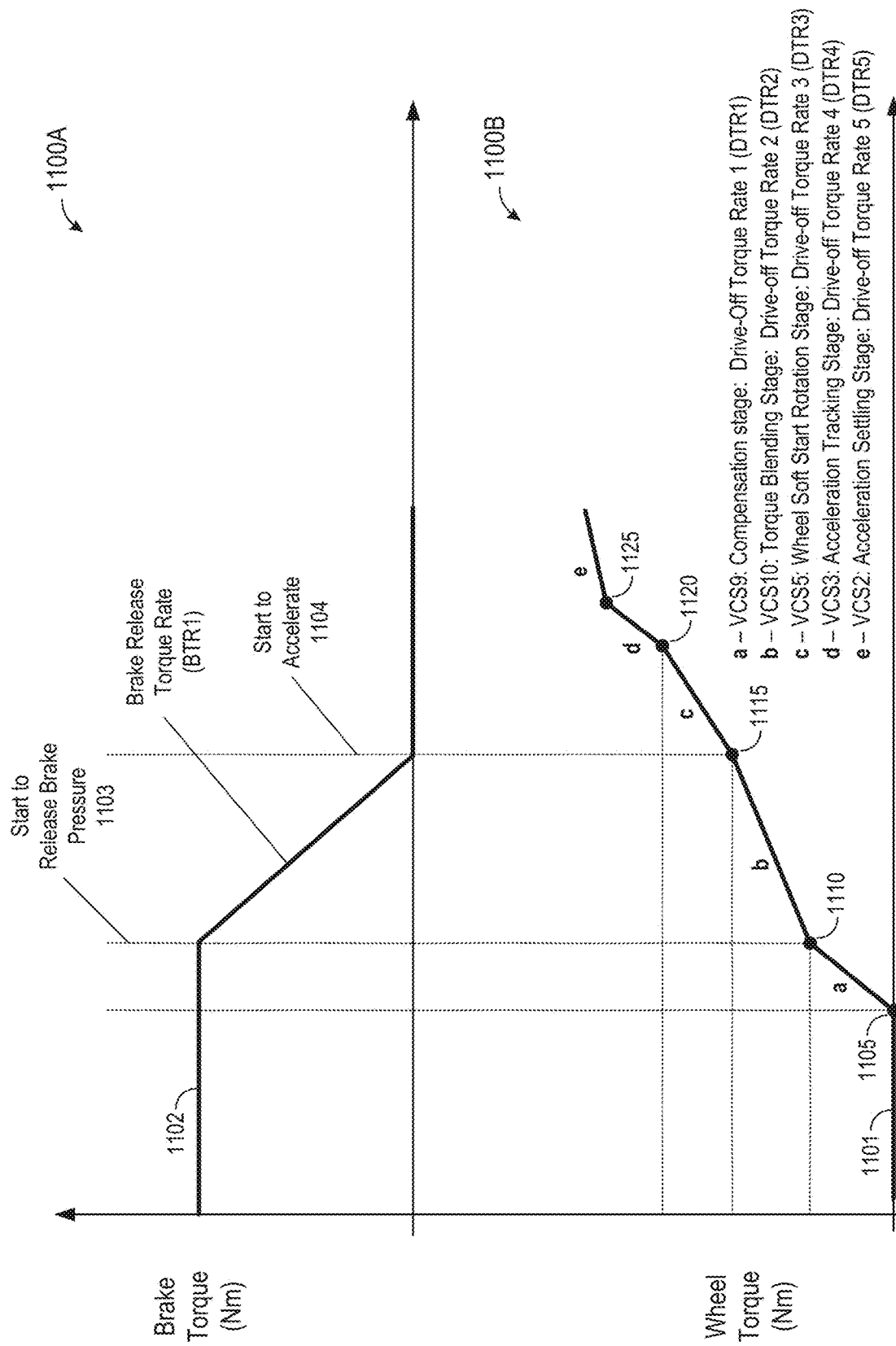
FIG. 11, which depicts examples of brake torque versus time 1100A and corresponding wheel torque versus time 1100B, according to embodiments of the present disclosure.

In the depicted embodiment in FIG. 11, both the brake release torque rate and the second drive-off torque rate are depicted as being linear; however, it shall be noted that different functions or models may be employed.

Note that, if the drive-off request is canceled (e.g., by a user or by the ADS planner module) while in the torque blending stage VCS10, a trigger SC14 may occur, which puts the ADV back to the state VCS4.

In one or more embodiments, one or more wheel sensors may be used to detect a speed of the ADV. The wheel sensors may generate magnetic pulses in the form of waves, proportional to the speed of the ADV. The ADV may be in different states based on the speed of the ADV. For example, one or more of the ADV's wheel sensors, which may be located at each of the wheels (i.e., front left (FL), front right (FR), rear left (RL), rear right (RR) wheel), may be used to detect the rolling speed of the ADV based on pulses detected.

Figure 12:
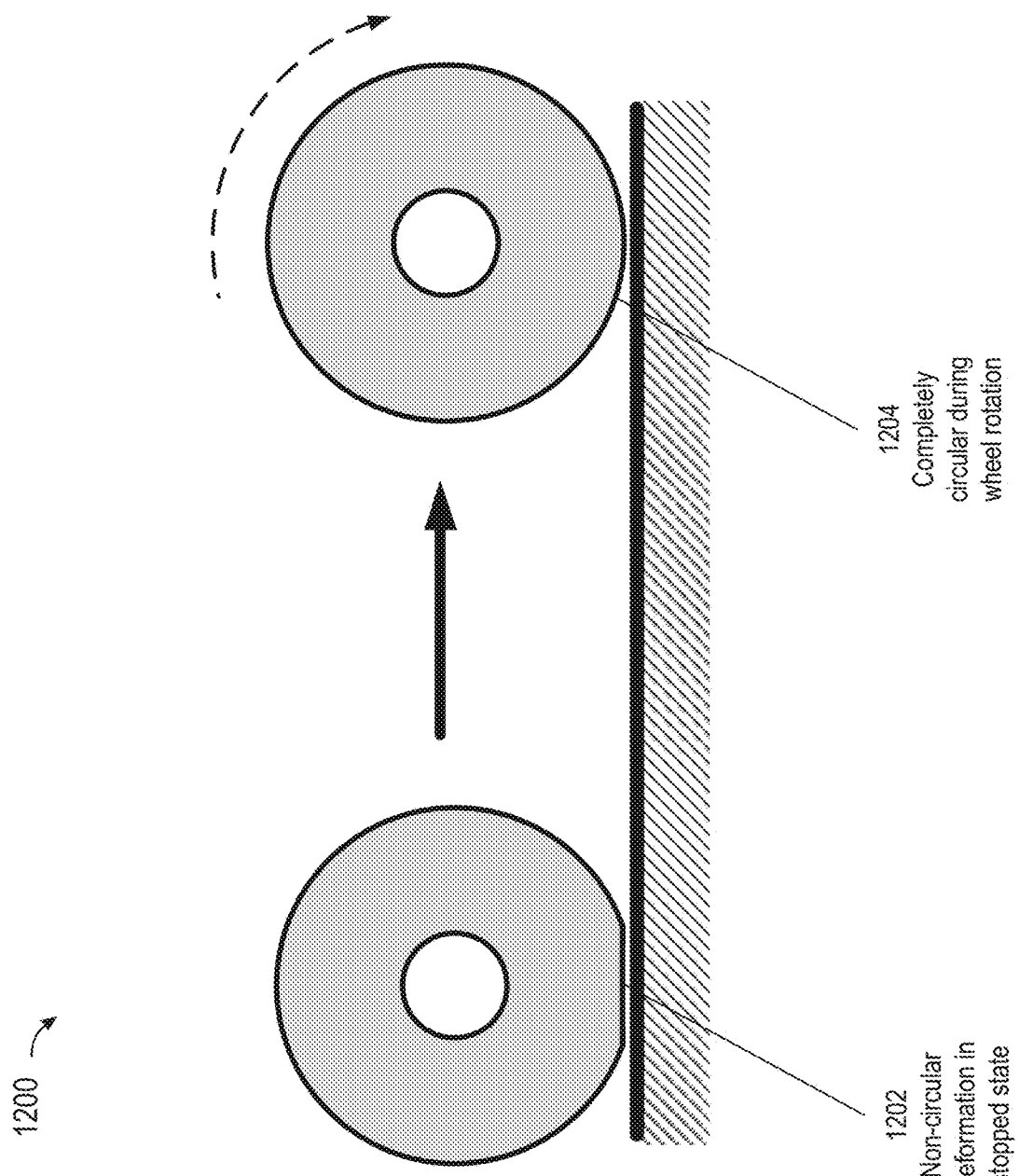
FIG. 12 depicts an issue related to the non-circularity of wheels as a result of being stopped, according to embodiments of the present disclosure.

In one or more embodiments, when at least a pair of diagonal wheel sensors (e.g., FL & RR or FR & RL) detects pulses within a first time period, a trigger SC13 may happen, in which the ADV may change to the state VCS5 in which the ADV is rolling 1115 (i.e., starts to accelerate 1104 in FIG. 11). For example, the first time period may be 250 ms, 350 ms, 450 ms, 550 ms, 650 ms, or another value. Note that, in one or more embodiments, a trigger SC6 from the state VCS4 to a state VCS3 may not be allowed. In one or more embodiments, the state VCS5 represents a wheel soft start rotation stage, which may be implemented with a third drive-off torque rate (e.g., DTR3), which may be based upon wheel torque of the wheels and may be based upon the rate at which torque is to be applied. An example DTR3 value may be approximately 1900 Nm/s. Because the ADV has been at a standstill, the bottom portion of the wheel resting against the road surface is deformed with a slight, flat portion. It is not until after the wheel starts rolling that it resumes its more circular shape. The issue is graphically depicted in FIG. 12, which shows the initial, deformed/non-circular wheel shape 1202 when the ADV is at a standstill, and the same wheel 1204 being more circular once rotating. Recognition of this hysteresis is helpful to aid in smooth drive-off and stage VCS5 helps compensate for this issue.

While in the state VCS5, when no wheel sensors may detect any pulses for a second period of time, a trigger SC5 may happen, in which the ADV may change back to the state VCS4; however, in one or more embodiments, when the rolling speed is larger than a first threshold speed (e.g., 0.5, 1, or 1.5 kph), a trigger SC9 may happen, in which the state of the ADV may change to the state VCS3. For example, the second time period may be 50 ms, 150 ms, 250 ms, 350 ms, 450 ms, or another value. In one or more embodiments, the state VCS3 may be referred to as the acceleration tracking stage and may employ a fourth drive-off rate (e.g., DTR4), which may be based upon wheel torque of the wheels and may be based upon the rate at which torque is to be applied. An example DTR4 value may be approximately 2900 Nm/s. In this stage, a soft drive-off is provided without wheel slip or jerking motion.

While in the state VCS3, when no wheel sensors may detect any pulses for a period of time (e.g., 180 milliseconds (ms)), a trigger SC3 may happen, in which the ADV may change back to the state VCS4 (i.e., standstill). However, when the rolling speed is larger than a second speed (e.g., 1.5, 2, or 2.5 kph), a trigger SC7 may happen, in which the state of the ADV may change to a state VCS2. In one or more embodiments, the state VCS2 may be referred to as the acceleration settling stage and may employ a fifth drive-off rate (e.g., DTR5), which may be based upon wheel torque of the wheels and may be based upon the rate at which torque is to be applied. An example DTR5 value may be approximately 1000 Nm/s. This stage allows for agile and smooth acceleration to a target level.

While in the state VCS2, when the rolling speed is less than the second speed (e.g., 1.5, 2, or 2.5 kph), a trigger SC2 may happen, in which the ADV may change back to the state VCS3. However, in one or more embodiments, when the rolling speed is larger than a third speed (e.g., 2, 3, 4, 5 kph or other value), a trigger SC8 may happen, in which the state of the ADV may change to a state VCS1. While in the state VCS1, when the rolling speed is less than a fourth speed (e.g., 2, 3, or 4 kph), a trigger SC1 may happen, in which the ADV may change back to the state VCS2.

In one or more embodiments, the brake release torque rate (i.e., BTR1) and/or one or more of the drive-off threshold values may, alternatively or additionally, be related to the slope angle, θ. For example, in one or more embodiments, the brake release torque rate and the drive-off threshold rates may be as follows:

$$BTR1 = B1 \times \theta$$

$$DTRn = Dn \times \theta$$

In one or more embodiments, the brake release torque rate (i.e., BTR1) and/or one or more of the drive-off threshold values may be based upon a function or machine learning model that receives one or more inputs (e.g., wheel torque value(s), slope angle, desired performance (e.g., faster or slower acceleration rates), road conditions, traffic conditions, etc.) to determine the values.

In one or more embodiments, the wheel torque threshold value 1110 may also be based upon one or more parameters. The wheel torque threshold value ($T_{wheel\_torque}$) may be based upon or related to the braking torque (e.g., $T_{wheel\_torque} = \alpha T_{brake\_torque}$), where $T_{brake\_torque}$ represents the braking torque value and α represents a coefficient (which may be preset) or a function that determines a coefficient value to multiple with the braking torque. The wheel torque threshold value may be computed in real-time or near real-time using one or more sensors to gauge the braking torque and any factors relevant to the function, a, which may be determined using input parameters such as road conditions, weather conditions, engine type, braking conditions, etc. Alternatively or additionally, the wheel torque threshold value ($T_{wheel\_torque}$) may be related to slope angle (i.e., θ) and vehicle mass. In one or more embodiments, the vehicle mass may be a preset value for the mass of the ADV. Alternatively, the mass value may be determined in real-time or near real-time using one or more sensors of the ADV. For example, previous occurrences of acceleration, deceleration, and/or braking may be used to obtain values, using ADV sensors, to compute a mass value for the vehicle, including its cargo (i.e., occupants and other baggage).

Although it shall be noted that for the rates and values discussed herein, different values and/or different formulas or models may be used. In one or more embodiments, one or more of the rates (i.e., BTR1 and DTRn) or values (e.g., $T_{wheel\_torque}$) may be obtained by using a look-up table that utilizes one or more parameters to look-up a value for a rate. Factors such as number and/or types of brakes employed, weight/mass of the vehicle (and occupants), slope angle, road conditions, weather conditions (e.g., raining), safety (e.g., need for acceleration due to safety issues), traffic conditions, etc. may be considered. In one or more embodiments, the rates and values may be determined using one or more machine learning models.

Figure 13:
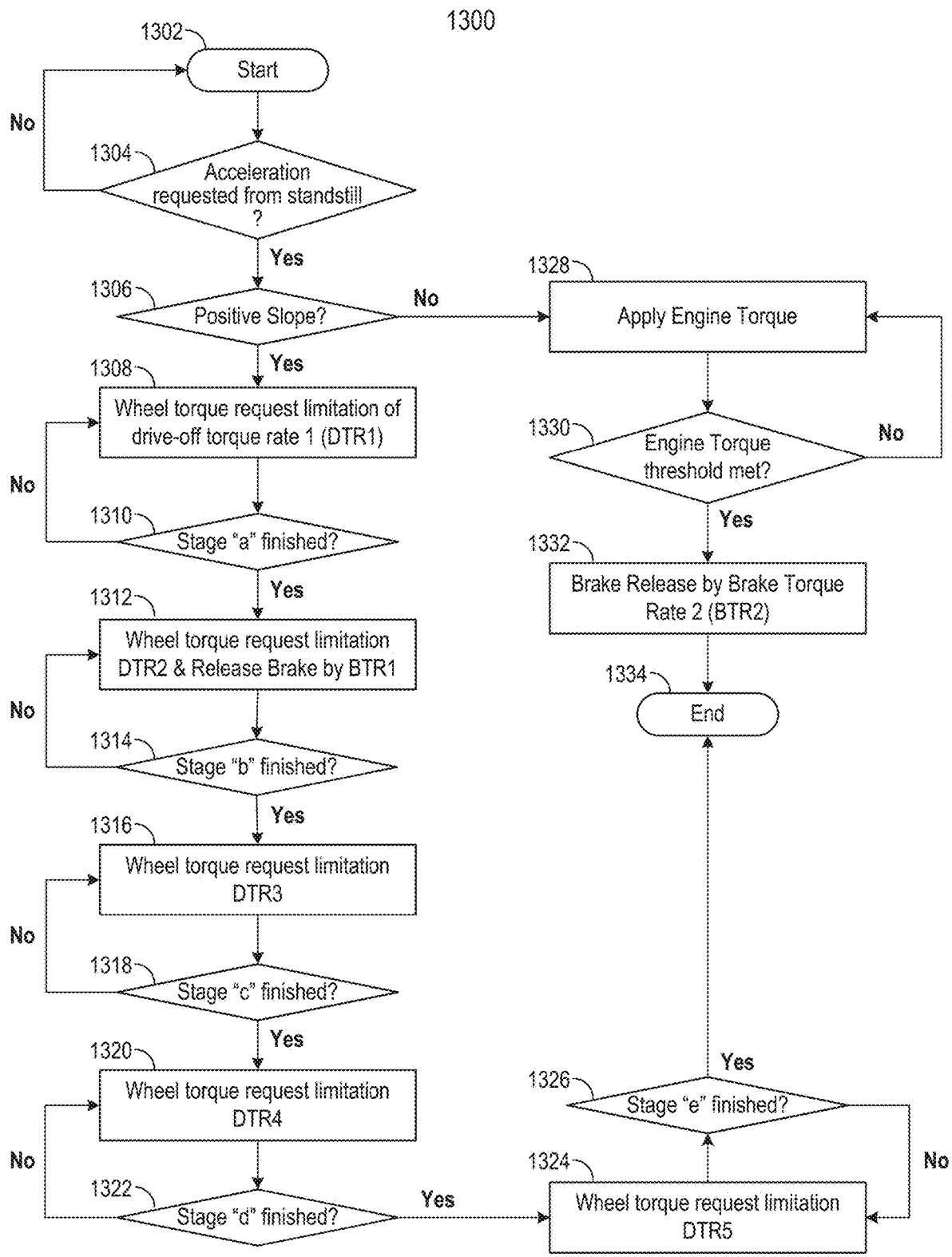
FIG. 13 depicts an alternative methodology for drive-off of an autonomous driving vehicle, according to embodiments of the present disclosure.

FIG. 13 depicts an alternative methodology, according to embodiments of the present disclosure. In one or more embodiments, the overall process 1300 may start (1302) or be operating while the ADV is at a standstill/stop. The process may be waiting until a request to accelerate is received (1304). In one or more embodiments, a determination may be made (1306) whether the ADV is at a positive slope angle, which may be determined using one or more sensors. For example, the gradient value of the slope angle may be determined using one or more IMU sensors or high-intensity maps and GPS.

If the gradient/slope angle is greater than or equal to a preset threshold (e.g., 2 to 5 degrees), the slope is deemed to be positive, and if it is positive, a wheel torque request limitation is set (1308) at a first drive-off torque rate (e.g., DTR1), which continues (1310) until the end of a first stage, stage "a," which may be considered to correspond to a torque compensation stage (e.g., VCS9 in FIG. 10). In one or more embodiments, stage "a" may be deemed to have concluded when a wheel torque threshold value (see, e.g., point 1110 in FIG. 11) has been reached.

Responsive to stage "a" finishing (1310), a wheel torque request limitation is set (1312) at a second drive-off torque rate (e.g., DTR2) and the braking is released at a first brake release rate (e.g., BTR1). This process continues (1314) until the end of a second stage, stage "b," which may be considered to correspond to a torque blending stage (e.g., VCS10 in FIG. 10).

Responsive to stage "b" finishing (1314), a wheel torque request limitation is set (1316) at a third drive-off torque rate (e.g., DTR3), which continues (1318) until the end of a third stage, stage "c," which may be considered to correspond to a torque blending stage (e.g., VCS5 in FIG. 10).

Responsive to stage "c" finishing (1318), a wheel torque request limitation is set (1320) at a fourth drive-off torque rate (e.g., DTR4), which continues (1322) until the end of a fourth stage, stage "d," which may be considered to correspond to an acceleration tracking stage (e.g., VCS3 in FIG. 10).

Responsive to stage "d" finishing (1322), a wheel torque request limitation is set (1324) at a fifth drive-off torque rate (e.g., DTR5), which continues (1326) until the end of a fourth stage, stage "e," which may be considered to correspond to an acceleration settling stage (e.g., VCS2 in FIG. 10).

It shall be noted that while FIG. 13 ends (1332) after stage "e," one or more additional stages or other processes may be performed.

If the gradient/slope angle is (1306) not greater than or equal to the preset threshold value, the slope may be deemed to be flat or negative. In one or more embodiments, the ADS may begin to apply (1328) engine torque. In one or more embodiments, a check may be made (1330) to determine whether an engine torque threshold has been met (1328). When an acceleration request has been made, this check determines whether it reaches a set threshold (e.g., approximately 1-2%); this setting helps to avoid a mis-trigger of the acceleration and/or for potential noisy signals.

If the engine torque threshold has been met (1330), in one or more embodiments, the braking may be released (1332) according to a second braking release rate (e.g., BTR2). When the ADV is on a flat surface, the brake torque may be released immediately. When the ADV is on a negative surface, the brake torque may be released immediately or may be released according to a model or table that may use as inputs one or more parameters, such as the gradient of the slope angle, vehicle weight, road conditions, weather conditions, traffic conditions, etc., in like manner as described above related to BTR1.

As noted previously, the drive-off torque rates and the braking release rates may be set values, may be determined by one or more functions or models that utilize one or more parameters, and/or may be determined via a look-up table or tables.

Figure 14:
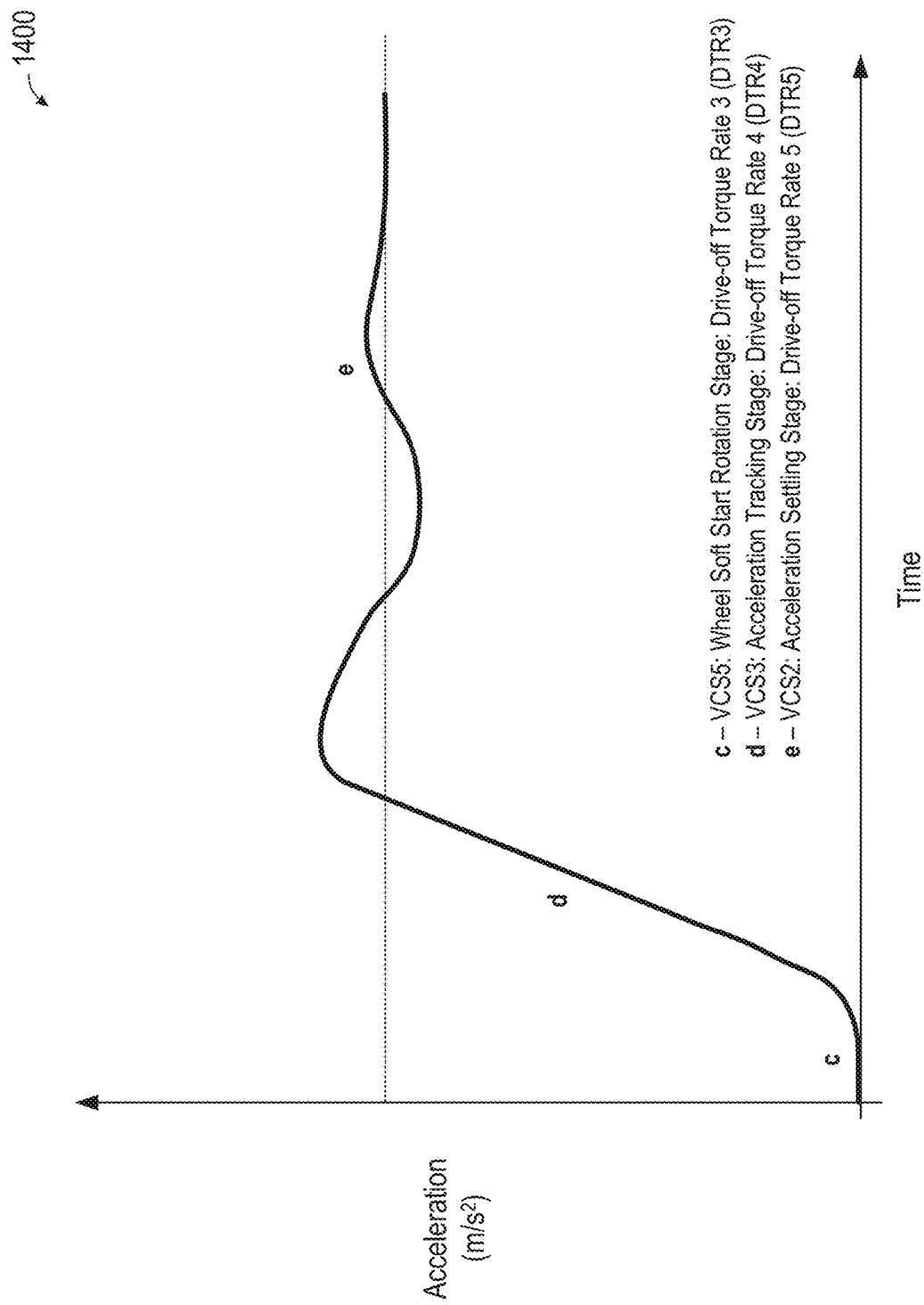
FIG. 14 depicts an example acceleration graph versus time, according to embodiments of the present disclosure.

FIG. 14 depicts an example acceleration graph versus time, according to embodiments of the present disclosure. The graph 1400 depicts an example acceleration profile that may result from the implementation of a methodology, such as depicted in FIG. 13. Note that the graph 1400 depicts the effects on acceleration during various stages (stages c, d, and e). It shall be noted that the graph 1400 is merely one example and different implementations of the stages will result in different acceleration profiles.

Figure 15A:
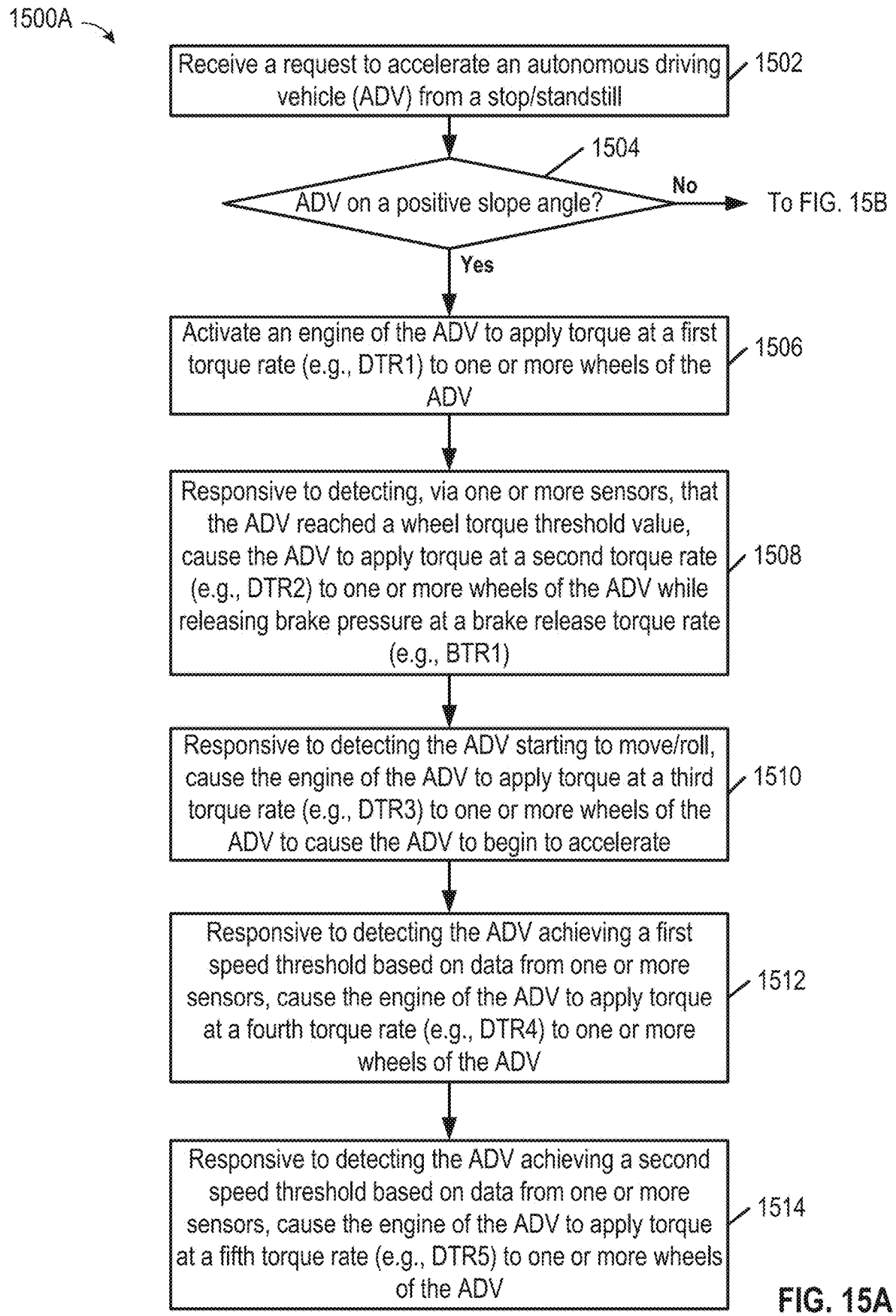
FIGS. 15A & 15B depict another methodology for facilitating a start from a stop position for an autonomous driving vehicle, according to embodiments of the present disclosure.
Figure 15B:
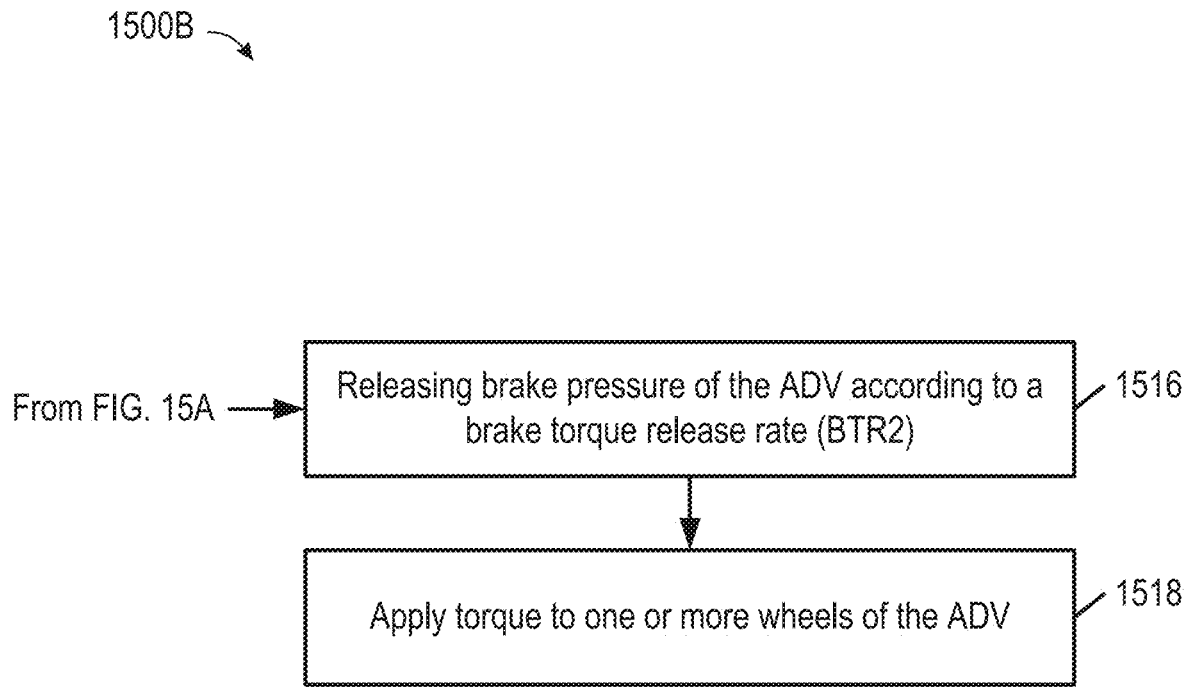

FIGS. 15A & 15B depict another methodology for facilitating a start from a stop position for an ADV, according to embodiments of the present disclosure. As depicted in FIG. 15A, a request to accelerate an autonomous driving vehicle (ADV) from a stop/standstill is received (1504), which may be received from the ADS (e.g., from a planning module of the ADS).

In one or more embodiments, the slope angle of the ADV is determined (1504) to ascertain whether the ADV is at a positive, neutral, or negative slope angle. The slope angle may be determined using one or more sensors, as discussed previously. Responsive to the ADV being deemed to be at a positive slope angle, an engine of the ADV may be activated (1506) to apply torque at a first torque rate (e.g., DTR1) to one or more wheels of the ADV.

In one or more embodiments, responsive to detecting, via one or more sensors, that the ADV has reached a wheel torque threshold value, the ADS may cause (1508) the engine of the ADV to apply torque at a second torque rate (e.g., DTR2) to one or more wheels of the ADV while deactivating or disengaging the brakes of the ADV at a brake release torque rate (e.g., BTR1).

In one or more embodiments, responsive to detecting the ADV starting to move/roll, which may be detected by one or more sensors of the ADV, the ADS may cause (1510) the engine of the ADV to apply torque at a third torque rate (e.g., DTR3) to one or more wheels of the ADV to cause the ADV to begin to accelerate.

In one or more embodiments, responsive to detecting the ADV achieving a first predetermined speed threshold based on data from one or more sensors, the ADS may cause (1512) the engine of the ADV to apply torque at a fourth torque rate (e.g., DTR4) to one or more wheels of the ADV.

In one or more embodiments, responsive to detecting the ADV achieving a second predetermined speed threshold based on data from one or more sensors, the ADS may cause (1514) the engine of the ADV to apply torque at a fifth torque rate (e.g., DTR5) to one or more wheels of the ADV. The ADS may continue to apply the fifth torque rate until a condition, such as a set speed, has been reached.

Turning now to FIG. 15B, if the slope angle of the ADV is determined (1504) to be a neutral or negative slope angle, the ADS may cause (1516) the braking torque to be deactivated or disengaged. The ADS may also cause (1518) wheel torque, via an engine, to be applied; however, given the neutral or negative slope angle, no torque blending phase may be needed as with a positive slope angle. In one or more embodiments, the rate of wheel torque that is applied may be related to one or more parameters, including but not limited to the value of the slope angle.

C. Computing System Embodiments

In one or more embodiments, aspects of the present patent document may be directed to, may include, or may be implemented on or use one or more computing systems. An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a specialized processor-enabled computing system, a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drive, solid-state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 16:
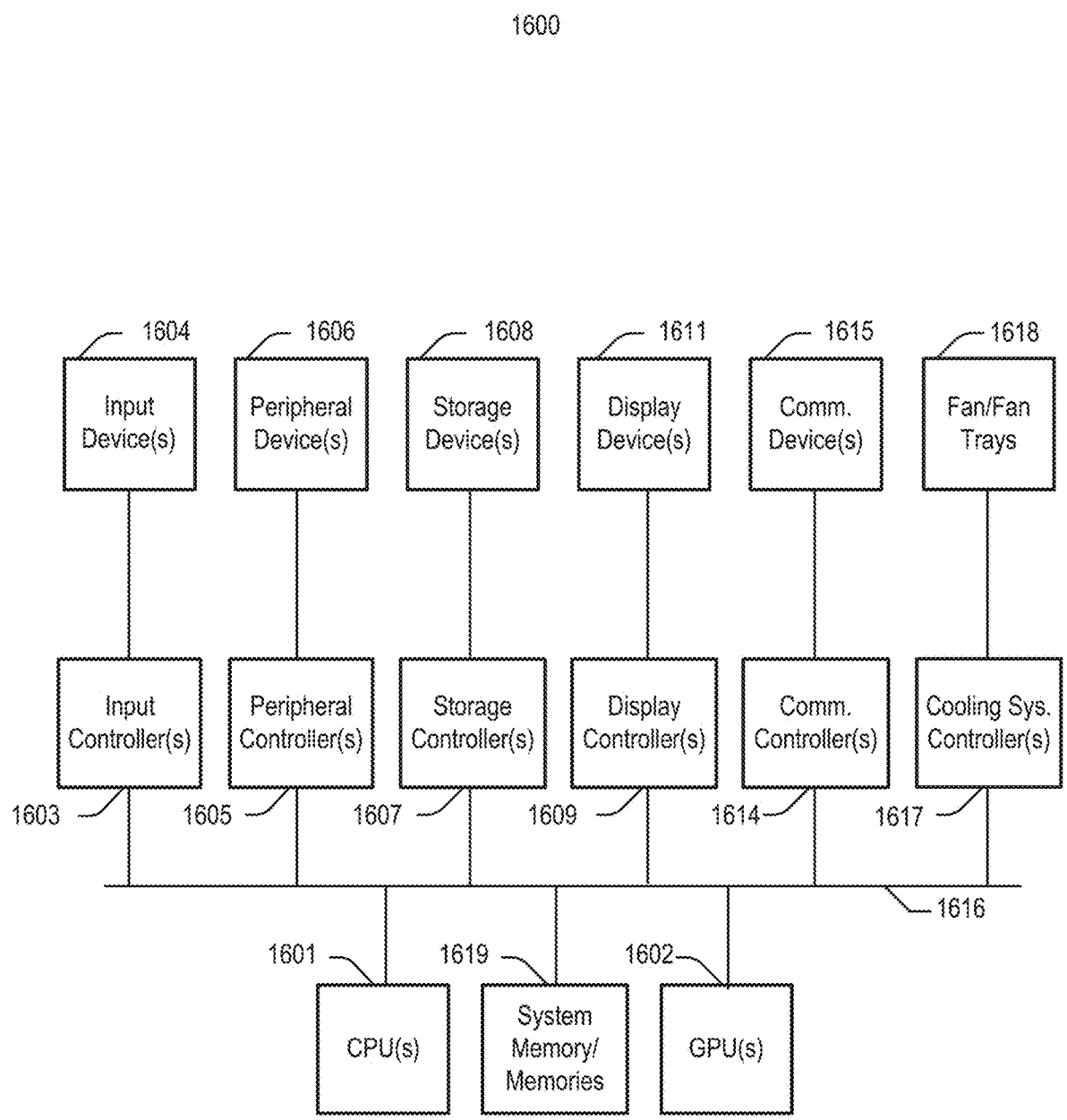
FIG. 16 depicts a simplified block diagram of a computing device, according to embodiments of the present disclosure.

FIG. 16 depicts a simplified block diagram of an information handling system (or computing system), according to embodiments of the present disclosure. It will be understood that the functionalities shown for system 1600 may operate to support various embodiments of a computing system—although it shall be understood that a computing system may be differently configured and include different components, including having fewer or more components as depicted in FIG. 16.

As illustrated in FIG. 16, the computing system 1600 includes one or more CPUs 1601 that provide computing resources and control the computer. CPU 1601 may be implemented with a microprocessor or the like, and may also include one or more graphics processing units (GPU) 1602 and/or a floating-point coprocessor for mathematical computations. In one or more embodiments, one or more GPUs 1602 may be incorporated within the display controller 1609, such as part of a graphics card or cards. Thy system 1600 may also include a system memory 1619, which may comprise RAM, ROM, or both.

A number of controllers and peripheral devices may also be provided, as shown in FIG. 16. An input controller 1603 represents an interface to various input device(s) 1604. The computing system 1600 may also include a storage controller 1607 for interfacing with one or more storage devices 1608 each of which includes a storage medium such as magnetic tape or disk, or an optical medium that might be used to record programs of instructions for operating systems, utilities, and applications, which may include embodiments of programs that implement various aspects of the present disclosure. Storage device(s) 1608 may also be used to store processed data or data to be processed in accordance with the disclosure. The system 1600 may also include a display controller 1609 for providing an interface to a display device 1611, which may be a cathode ray tube (CRT) display, a thin film transistor (TFT) display, organic light-emitting diode, electroluminescent panel, plasma panel, or any other type of display. The computing system 1600 may also include one or more peripheral controllers or interfaces 1605 for one or more peripherals 1606. Examples of peripherals may include one or more printers, scanners, input devices, output devices, sensors, and the like. A communications controller 1614 may interface with one or more communication devices 1615, which enables the system 1600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1600 comprises one or more fans or fan trays 1618 and a cooling subsystem controller or controllers 1617 that monitors thermal temperature(s) of the system 1600 (or components thereof) and operates the fans/fan trays 1618 to help regulate the temperature.

In the illustrated system, all major system components may connect to a bus 1616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations. The specification and drawings are, accordingly, to be regarded in an illustrative sense rather than a restrictive sense.

What is claimed is:

1. A computer-implemented method for operating an autonomous driving vehicle (ADV), the method comprising:
   receiving a request to accelerate the ADV from a standstill; and
   responsive to the ADV being detected to be at a positive slope angle,
      activating an engine of the ADV to apply torque at a first drive-off torque rate to one or more wheels of the ADV,
      responsive to detecting, via one or more sensors, the ADV reaching a wheel torque threshold value, causing the engine of the ADV to apply torque at a second drive-off torque rate to the one or more wheels of the ADV, and releasing pressure of one or more brakes of the ADV at a brake release torque rate, wherein the second drive-off torque rate is less than the first drive-off torque rate, and the brake release torque rate is determined relative to the second drive-off torque rate,
      responsive to detecting the ADV starting to move, causing the engine of the ADV to apply torque at a third drive-off torque rate to the one or more wheels of the ADV to cause the ADV to accelerate, wherein the third drive-off torque rate is greater than the second drive-off torque rate and less than the first drive-off torque rate, and
      responsive to detecting the ADV achieving a first predetermined speed threshold based on data from one or more sensors, causing the engine of the ADV to apply torque at a fourth drive-off torque rate to the one or more wheels of the ADV, wherein the fourth drive-off torque rate is greater than the third drive-off torque rate.

2. The computer-implemented method of claim 1 wherein:
   responsive to receiving a request to drive and responsive to the ADV being detected to be at a neural or negative slope angle, deactivating braking of the ADV.

3. The computer-implemented method of claim 2 further comprising:
applying torque to the one or more wheels of the ADV at a rate that is related to a degree of neutral or negative slope of the ADV that is detected.

4. The computer-implemented method of claim 1 further comprising:
determining the wheel torque threshold value using one or more parameters.

5. The computer-implemented method of claim 4 wherein:
the one or more parameters comprise a weight value assigned to the ADV and a degree of the positive slope detected for the ADV; and
the wheel torque threshold value is related to the weight value assigned to the ADV and a degree of the positive slope detected for the ADV.

6. The computer-implemented method of claim 5 wherein:
the weight value assigned to the ADV is based upon one or more sensor values of the ADV.

7. The computer-implemented method of claim 1 further comprising:
responsive to detecting the ADV achieving a second predetermined speed threshold, which is higher than the first predetermined speed threshold, based on data from one or more sensors, causing the engine of the ADV to apply torque at a fifth drive-off torque rate to the one or more wheels of the ADV, wherein the fifth drive-off torque rate is less than the second drive-off torque rate.

8. A system comprising:
one or more processors; and
a non-transitory computer-readable medium or media comprising one or more sets of instructions which, when executed by at least one of the one or more processors, causes steps to be performed comprising:
receiving a request to accelerate an autonomous driving vehicle (ADV) from a standstill; and
responsive to the ADV being detected to be at a positive slope angle,
activating an engine of the ADV to apply torque at a first drive-off torque rate to one or more wheels of the ADVIL,
responsive to detecting the ADV reaching a wheel torque threshold value, causing the engine of the ADV to apply torque at a second drive-off torque rate to the one or more wheels of the ADV, and releasing pressure of one or more brakes of the ADV at a brake release torque rate, wherein the second drive-off torque rate is less than the first drive-off torque rate, and the brake release torque rate is determined relative to the second drive-off torque rate,
responsive to detecting the ADV starting to move, causing the engine of the ADV to apply torque at a third drive-off torque rate to the one or more wheels of the ADV to cause the ADV to accelerate, wherein the third drive-off torque rate is greater than the second drive-off torque rate and less than the first drive-off torque rate, and
responsive to detecting the ADV achieving a first predetermined speed threshold based on data from one or more sensors, causing the engine of the ADV to apply torque at a fourth drive-off torque rate to the one or more wheels of the ADV, wherein the fourth drive-off torque rate is greater than the third drive-off torque rate.

9. The system of claim 8 wherein:
responsive to receiving a request to drive and responsive to the ADV being detected to be at a neural or negative slope angle, deactivating braking of the ADV.

10. The system of claim 9 further comprising:
applying torque to the one or more wheels of the ADV at a rate that is related,-to a degree of neutral or negative slope of the ADV that is detected.

11. The system of claim 8 further comprising:
determining the wheel torque threshold value using a weight value assigned to the ADV and a degree of the positive slope detected for the ADV.

12. The system of claim 11 wherein:
the weight value assigned to the ADV is based upon one or more sensor values of the ADV.

13. The system of claim 8 further comprising:
responsive to detecting the ADV achieving a second predetermined speed threshold, which is higher than the first predetermined speed threshold, based on data from one or more sensors, causing the engine of the ADV to apply torque at a fifth drive-off torque rate to the one or more wheels of the ADV, wherein the fifth drive-off torque rate is less than the second drive-off torque rate.

14. A non-transitory computer-readable medium or media comprising one or more sequences of instructions which, when executed by at least one processor, causes steps to be performed comprising:
receiving a request to accelerate an autonomous driving vehicle (ADV) from a standstill; and
responsive to the ADV being detected to be at a positive slope angle,
activating an engine of the ADV to apply torque at a first drive-off torque rate to one or more wheels of the ADV,
responsive to detecting the ADV reaching a wheel torque threshold value, causing the engine of the ADV to apply torque at a second drive-off torque rate to the one or more wheels of the ADV, and releasing pressure of one or more brakes of the ADV at a brake release torque rate, wherein the second drive-off torque rate is less than the first drive-off torque rate, and the brake release torque rate is determined relative to the second drive-off torque rate,
responsive to detecting the ADV starting to move, causing the engine of the ADV to apply torque at a third drive-off torque rate to the one or more wheels of the ADV to cause the ADV to accelerate, wherein the third drive-off torque rate is greater than the second drive-off torque rate and less than the first drive-off torque rate, and
responsive to detecting the ADV achieving a first predetermined speed threshold based on data from one or more sensors, causing the engine of the ADV to apply torque at a fourth drive-off torque rate to the one or more wheels of the ADV, wherein the fourth drive-off torque rate is greater than the third drive-off torque rate.

15. The non-transitory computer-readable medium or media of claim 14 further comprising one or more sequences of instructions which, when executed by at least one processor, causes steps to be performed comprising:
responsive to receiving a request to drive and responsive to the ADV being detected to be at a neural or negative slope angle:

deactivating braking of the ADV; and applying torque to the one or more wheels of the ADV at a rate that is related to a degree of neutral or negative slope of the ADV that is detected.

16. The non-transitory computer-readable medium or media of claim 15 further comprising one or more sequences of instructions which, when executed by at least one processor, causes steps to be performed comprising:

determining the wheel torque threshold value using a weight value assigned to the ADV and a degree of the positive slope detected for the ADV.

17. The non-transitory computer-readable medium or media of claim 16 wherein the weight value assigned to the ADV is based upon at least one of:

one or more sensor values of the ADV; or a preset value.

18. The non-transitory computer-readable medium or media of claim 15 further comprising one or more sequences of instructions which, when executed by at least one processor, causes steps to be performed comprising:

responsive to detecting the ADV achieving a second predefined speed threshold, which is higher than the first speed threshold, based on data from one or more sensors, causing the engine of the ADV to apply torque at a fifth drive-off torque rate to the one or more wheels of the ADV, where the fifth drive-off torque rate is less than the second drive-off torque rate.

* * * * *